US010798523B2

(12) United States Patent
Zakaria

(10) Patent No.: US 10,798,523 B2
(45) Date of Patent: *Oct. 6, 2020

(54) SYSTEM AND METHOD FOR ACCURATELY SENSING USER LOCATION IN AN IOT SYSTEM

(71) Applicant: Afero, Inc., Los Altos, CA (US)

(72) Inventor: Omar Zakaria, Santa Clara, CA (US)

(73) Assignee: Afero, Inc., Los Altos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/056,228

(22) Filed: Aug. 6, 2018

(65) Prior Publication Data

US 2019/0075424 A1 Mar. 7, 2019

Related U.S. Application Data

(63) Continuation of application No. 14/673,551, filed on Mar. 30, 2015, now Pat. No. 10,045,150.

(51) Int. Cl.
*H04W 4/02* (2018.01)
*H04M 1/725* (2006.01)
*H04W 4/80* (2018.01)
*H04L 29/08* (2006.01)

(52) U.S. Cl.
CPC ............ *H04W 4/023* (2013.01); *H04L 67/12* (2013.01); *H04M 1/72533* (2013.01); *H04W 4/80* (2018.02); *H04L 67/18* (2013.01)

(58) Field of Classification Search
CPC combination set(s) only.
See application file for complete search history.

(56) References Cited

U.S. PATENT DOCUMENTS

| 4,654,793 A | 3/1987 | Elrod |
| 5,574,750 A | 11/1996 | Peponides et al. |
| 6,199,161 B1 | 3/2001 | Ahvenainen |

(Continued)

FOREIGN PATENT DOCUMENTS

| CN | 1054693 A | 9/1991 |
| CN | 101145914 A | 3/2008 |

(Continued)

OTHER PUBLICATIONS

Notice of Allowance from U.S. Appl. No. 14/550,735, dated Mar. 22, 2017, 32 pages.

(Continued)

*Primary Examiner* — Jinsong Hu
*Assistant Examiner* — Farideh Madani
(74) *Attorney, Agent, or Firm* — Nicholson De Vos Webster & Elliott LLP

(57) ABSTRACT

A system and method are described for accurately detecting a location of a wireless device. For example, one embodiment of a method comprises: collecting signal strength data indicating signal strength between a wireless device and a plurality of IoT devices and/or IoT hubs in a user's home; associating the signal strength data with locations in the user's home and storing the association in a location database; and determining a current location of the wireless device by comparing the signal strength data in the database with current signal strength data indicating current signal strength between the wireless device and the plurality of IoT devices and/or IoT hubs.

22 Claims, 22 Drawing Sheets

(56) References Cited

U.S. PATENT DOCUMENTS

| | | |
|---|---|---|
| 7,142,674 B2 | 11/2006 | Brickell |
| 7,146,613 B2 | 12/2006 | Chauvel et al. |
| 7,165,180 B1 | 1/2007 | Ducharme |
| 7,234,062 B2 | 6/2007 | Daum et al. |
| 7,493,661 B2 | 2/2009 | Liu et al. |
| 7,548,623 B2 | 6/2009 | Manabe |
| 7,779,136 B2 | 8/2010 | Krishnan |
| 7,903,822 B1 | 3/2011 | Hair et al. |
| 7,966,021 B2 | 6/2011 | Dietrich et al. |
| 8,396,449 B2 | 3/2013 | Hatton |
| 8,477,948 B2 | 7/2013 | Shon et al. |
| 8,570,168 B2 | 10/2013 | Logan et al. |
| 8,700,236 B1 | 4/2014 | Berman |
| 8,761,821 B2 | 6/2014 | Tibbitts et al. |
| 8,903,351 B2 | 12/2014 | Berry et al. |
| 9,319,223 B2 | 4/2016 | Nix |
| 9,319,317 B1 | 4/2016 | Spadaro et al. |
| 9,338,638 B1 | 5/2016 | Palin et al. |
| 9,378,634 B1 | 6/2016 | Kashyap et al. |
| 9,832,172 B2 | 11/2017 | Smith et al. |
| 9,832,173 B2 | 11/2017 | Britt et al. |
| 10,045,150 B2 * | 8/2018 | Zakaria ................ H04W 4/023 |
| 2002/0013784 A1 | 1/2002 | Swanson |
| 2002/0055924 A1 | 5/2002 | Liming |
| 2002/0142746 A1 | 10/2002 | Li et al. |
| 2003/0043073 A1 | 3/2003 | Gray et al. |
| 2003/0120555 A1 | 6/2003 | Kitagawa |
| 2003/0174836 A1 | 9/2003 | Vadekar |
| 2004/0047324 A1 | 3/2004 | Diener |
| 2004/0174264 A1 | 9/2004 | Reisman et al. |
| 2004/0203826 A1 | 10/2004 | Sugar et al. |
| 2004/0253923 A1 | 12/2004 | Braley et al. |
| 2006/0018485 A1 | 1/2006 | Diefenderfer et al. |
| 2006/0135064 A1 | 6/2006 | Cho et al. |
| 2006/0185393 A1 | 8/2006 | Cherry et al. |
| 2006/0195883 A1 | 8/2006 | Proctor et al. |
| 2007/0064725 A1 | 3/2007 | Minami et al. |
| 2007/0126560 A1 | 6/2007 | Seymour et al. |
| 2007/0150740 A1 | 6/2007 | Davis et al. |
| 2007/0205876 A1 | 9/2007 | Nguyen |
| 2008/0001764 A1 | 1/2008 | Douglas et al. |
| 2008/0026718 A1 | 1/2008 | Wangard et al. |
| 2008/0039203 A1 | 2/2008 | Ackley et al. |
| 2008/0120701 A1 | 5/2008 | Schiller et al. |
| 2008/0129545 A1 | 6/2008 | Johnson et al. |
| 2008/0180222 A1 | 7/2008 | Hollister et al. |
| 2008/0200195 A1 | 8/2008 | Abe et al. |
| 2008/0204555 A1 | 8/2008 | Hughes et al. |
| 2008/0312946 A1 | 12/2008 | Valentine et al. |
| 2009/0011739 A1 | 1/2009 | Cofta |
| 2009/0019423 A1 | 1/2009 | Halter et al. |
| 2009/0061806 A1 | 3/2009 | Saito et al. |
| 2009/0082017 A1 | 3/2009 | Chang et al. |
| 2009/0158921 A1 | 6/2009 | Norman |
| 2009/0315714 A1 | 12/2009 | Sher |
| 2009/0327996 A1 | 12/2009 | Siegemund et al. |
| 2010/0030695 A1 | 2/2010 | Chen et al. |
| 2010/0075655 A1 | 3/2010 | Howarter et al. |
| 2010/0091995 A1 | 4/2010 | Chen et al. |
| 2010/0115291 A1 | 5/2010 | Buer |
| 2010/0122083 A1 | 5/2010 | Gim et al. |
| 2010/0135494 A1 | 6/2010 | Armknecht et al. |
| 2010/0201482 A1 | 8/2010 | Robertson et al. |
| 2011/0081860 A1 | 4/2011 | Brown et al. |
| 2011/0151768 A1 | 6/2011 | Snider et al. |
| 2011/0191787 A1 | 8/2011 | Poleg et al. |
| 2011/0200188 A1 | 8/2011 | Ghouti et al. |
| 2011/0252235 A1 | 10/2011 | Dolan et al. |
| 2011/0302078 A1 | 12/2011 | Failing |
| 2011/0319088 A1 | 12/2011 | Zhou et al. |
| 2012/0011360 A1 | 1/2012 | Engels et al. |
| 2012/0036552 A1 | 2/2012 | Dare et al. |
| 2012/0079045 A1 | 3/2012 | Plotkin |
| 2012/0108230 A1 | 5/2012 | Stepanian |
| 2012/0122461 A1 | 5/2012 | Hossain et al. |
| 2012/0142271 A1 | 6/2012 | Zhodzishsky et al. |
| 2012/0187187 A1 | 7/2012 | Duff et al. |
| 2012/0224694 A1 | 9/2012 | Lu et al. |
| 2012/0225640 A1 | 9/2012 | Bosch et al. |
| 2012/0230210 A1 | 9/2012 | Reed |
| 2012/0322384 A1 | 12/2012 | Zerr et al. |
| 2012/0331287 A1 | 12/2012 | Bowman et al. |
| 2013/0012123 A1 | 1/2013 | Deluca |
| 2013/0012134 A1 | 1/2013 | Jin et al. |
| 2013/0042244 A1 | 2/2013 | Li et al. |
| 2013/0054863 A1 | 2/2013 | Imes et al. |
| 2013/0085614 A1 | 4/2013 | Wenzel et al. |
| 2013/0154819 A1 | 6/2013 | Stefanovski et al. |
| 2013/0173484 A1 | 7/2013 | Wesby |
| 2013/0190010 A1 | 7/2013 | Chiou et al. |
| 2013/0246996 A1 | 9/2013 | Duggal et al. |
| 2013/0257604 A1 | 10/2013 | Mirle et al. |
| 2013/0307702 A1 | 11/2013 | Pal et al. |
| 2013/0342314 A1 | 12/2013 | Chen et al. |
| 2014/0020073 A1 | 1/2014 | Ronda et al. |
| 2014/0038526 A1 | 2/2014 | Ennis et al. |
| 2014/0039691 A1 | 2/2014 | Gupta et al. |
| 2014/0047322 A1 | 2/2014 | Kim et al. |
| 2014/0066098 A1 | 3/2014 | Stern et al. |
| 2014/0075075 A1 | 3/2014 | Morrill et al. |
| 2014/0075198 A1 | 3/2014 | Peirce et al. |
| 2014/0098957 A1 | 4/2014 | Larsson |
| 2014/0148196 A1* | 5/2014 | Bassan-Eskenazi .... G01S 11/02 |
| | | 455/456.1 |
| 2014/0155031 A1 | 6/2014 | Lee et al. |
| 2014/0179338 A1 | 6/2014 | Shang et al. |
| 2014/0225730 A1 | 8/2014 | Depascale et al. |
| 2014/0241354 A1* | 8/2014 | Shuman ................ H04L 67/16 |
| | | 370/390 |
| 2014/0244825 A1 | 8/2014 | Cao et al. |
| 2014/0270166 A1 | 9/2014 | Avanzi et al. |
| 2014/0279546 A1 | 9/2014 | Poole et al. |
| 2014/0281547 A1 | 9/2014 | Modzelewski et al. |
| 2014/0282357 A1 | 9/2014 | Padaliak et al. |
| 2014/0289366 A1 | 9/2014 | Choi et al. |
| 2014/0304381 A1 | 10/2014 | Savolainen et al. |
| 2014/0310515 A1 | 10/2014 | Kim et al. |
| 2014/0317293 A1 | 10/2014 | Shatzkamer |
| 2014/0329467 A1 | 11/2014 | Ewing et al. |
| 2014/0351312 A1 | 11/2014 | Lu et al. |
| 2014/0351790 A1 | 11/2014 | Ghose et al. |
| 2015/0006696 A1 | 1/2015 | Hershberg et al. |
| 2015/0019553 A1 | 1/2015 | Shaashua et al. |
| 2015/0019714 A1* | 1/2015 | Shaashua ................ H04W 4/70 |
| | | 709/224 |
| 2015/0029880 A1 | 1/2015 | Burns et al. |
| 2015/0035672 A1 | 2/2015 | Housley et al. |
| 2015/0058802 A1 | 2/2015 | Turaj et al. |
| 2015/0067329 A1 | 3/2015 | Ben et al. |
| 2015/0067580 A1 | 3/2015 | Um et al. |
| 2015/0071139 A1 | 3/2015 | Nix |
| 2015/0089568 A1 | 3/2015 | Sprague et al. |
| 2015/0106616 A1 | 4/2015 | Nix |
| 2015/0112963 A1 | 4/2015 | Mojtahedi et al. |
| 2015/0113275 A1 | 4/2015 | Kim et al. |
| 2015/0113592 A1 | 4/2015 | Curtis et al. |
| 2015/0119070 A1 | 4/2015 | Harris et al. |
| 2015/0121470 A1 | 4/2015 | Rongo et al. |
| 2015/0134761 A1 | 5/2015 | Sharma et al. |
| 2015/0145676 A1* | 5/2015 | Adhikari ................ A61B 5/1112 |
| | | 340/539.32 |
| 2015/0148989 A1 | 5/2015 | Cooper et al. |
| 2015/0149042 A1 | 5/2015 | Cooper et al. |
| 2015/0201022 A1 | 7/2015 | Kim et al. |
| 2015/0207796 A1 | 7/2015 | Love et al. |
| 2015/0222517 A1 | 8/2015 | McLaughlin et al. |
| 2015/0229563 A1 | 8/2015 | Luo |
| 2015/0288667 A1 | 10/2015 | Alder |
| 2015/0295713 A1 | 10/2015 | Oxford et al. |
| 2015/0296325 A1 | 10/2015 | Lee et al. |
| 2015/0312041 A1 | 10/2015 | Choi |
| 2015/0319046 A1 | 11/2015 | Plummer et al. |
| 2015/0324181 A1 | 11/2015 | Segal |
| 2015/0326398 A1 | 11/2015 | Modarresi et al. |

(56) References Cited

U.S. PATENT DOCUMENTS

| | | | |
|---|---|---|---|
| 2015/0358157 A1 | 12/2015 | Zhang et al. | |
| 2015/0358777 A1 | 12/2015 | Gupta | |
| 2015/0365787 A1 | 12/2015 | Farrell | |
| 2016/0006729 A1 | 1/2016 | Yang et al. | |
| 2016/0063767 A1 | 3/2016 | Lee et al. | |
| 2016/0085960 A1 | 3/2016 | Priev et al. | |
| 2016/0112870 A1 | 4/2016 | Pathuri et al. | |
| 2016/0127209 A1* | 5/2016 | Singh | H04W 24/02 455/435.2 |
| 2016/0127874 A1 | 5/2016 | Kingsmill et al. | |
| 2016/0149696 A1 | 5/2016 | Winslow et al. | |
| 2016/0150350 A1 | 5/2016 | Ingale et al. | |
| 2016/0150357 A1* | 5/2016 | Jung | H04W 52/0206 455/41.1 |
| 2016/0182228 A1 | 6/2016 | Smith et al. | |
| 2016/0182459 A1* | 6/2016 | Britt | H04L 67/12 713/171 |
| 2016/0182549 A1 | 6/2016 | Bachar et al. | |
| 2016/0202342 A1* | 7/2016 | Collins | G01S 5/0252 455/456.2 |
| 2016/0292938 A1 | 10/2016 | Zakaria et al. | |
| 2016/0295364 A1 | 10/2016 | Zakaria et al. | |
| 2016/0337844 A1 | 11/2016 | Hailpern et al. | |
| 2016/0379464 A1 | 12/2016 | Sedayao et al. | |
| 2017/0127304 A1 | 5/2017 | Britt et al. | |
| 2017/0331860 A1 | 11/2017 | Ofversten et al. | |
| 2017/0332330 A1 | 11/2017 | Dhandu et al. | |
| 2018/0054423 A1 | 2/2018 | Liu et al. | |

FOREIGN PATENT DOCUMENTS

| | | |
|---|---|---|
| CN | 102098780 A | 6/2011 |
| CN | 102379141 A | 3/2012 |
| CN | 202406123 U | 8/2012 |
| CN | 103166919 A | 6/2013 |
| CN | 103428830 A | 12/2013 |
| CN | 103609087 A | 2/2014 |
| CN | 103685574 A | 3/2014 |
| CN | 103781159 A | 5/2014 |
| CN | 104155938 A | 11/2014 |
| CN | 104331755 A | 2/2015 |
| EP | 2806356 A1 | 11/2014 |
| JP | 2005-101987 A | 4/2005 |
| JP | 2009-045139 A | 3/2009 |
| WO | 2013179634 A1 | 12/2013 |
| WO | 2014131021 A2 | 8/2014 |

OTHER PUBLICATIONS

Notice of Allowance from U.S. Appl. No. 14/575,463, dated Apr. 5, 2017, 35 pages.
Notice of Allowance from U.S. Appl. No. 14/673,551, dated May 7, 2018, 13 pages.
Notice of Allowance from U.S. Appl. No. 14/673,582, dated Mar. 1, 2017, 28 pages.
Notice of Allowance from U.S. Appl. No. 14/727,811, dated Apr. 12, 2017, 38 pages.
Notice of Allowance from U.S. Appl. No. 14/791,371, dated May 30, 2017, 31 pages.
Notice of Allowance from U.S. Appl. No. 14/791,373, dated Apr. 21, 2017, 19 pages.
Notice of Allowance from U.S. Appl. No. 14/927,732, dated Aug. 18, 2017, 14 pages.
Notice of Allowance from U.S. Appl. No. 14/967,702, dated Jun. 11, 2018, 22 pages.
Notice of Allowance from U.S. Appl. No. 14/967,702, dated Sep. 10, 2018, 18 pages.
Notice of Allowance from U.S. Appl. No. 15/473,423, dated Oct. 4, 2017, 32 pages.
Perera et al, Dynamic Configuration of Sensors Using Mobile Sensor Hub in Internet o Things Paradigm, Research School of Computer Science, The Australian National University, arXiv:1302.1131 v1, Feb. 2013, 6 pages.
Qiao Q.,"The Design of Electronic Thermometer Based on Bluetooth Low Energy," IEEE, 2013, pp. 1-5.
Restriction Requirement for U.S. Appl. No. 14/575,535, dated Apr. 11, 2016, 5 pages.
Saxena et al., "Secure Device Pairing based on a Visual Channel", Proceedings of the 2006 IEEE Symposium on Security and Privacy, ISBN: 0769525741, 2006, 7 pages.
Sye Loong Keoh, Securing the Internet of Things: A Standardization Perspective, IEEE Internet of Things Journal, vol. 1, No. 3, Jun. 2014; p. 265-275.
Wikipedia, "Bluetooth low energy" found at en.wikipedia.org/wiki/Bluetooth_low_energy,5/10, 10 pages.
Abandonment from U.S. Appl. No. 14/575,463, dated Jul. 26, 2017, 1 page.
Abandonment from U.S. Appl. No. 14/575,535, dated May 18, 2017, 2 pages.
Blackstock et al., "IoT Interoperability: A Hub-based Approach," International Conference on the Internet of Things, 2014, pp. 79-84.
Bonetto R., et al., "Secure Communication for Smart IoT Devices: Protocol Stacks, Use Cases and Practical Examples," IEEE, 2012, pp. 1-7.
Corrected Notice of Allowability from U.S. Appl. No. 14/673,551, dated Jul. 3, 2018, 6 pages.
Final Office Action from U.S. Appl. No. 14/550,775, dated Apr. 5, 2018, 23 pages.
Final Office Action from U.S. Appl. No. 14/550,775, dated Apr. 6, 2017, 39 pages.
Final Office Action from U.S. Appl. No. 14/575,463, dated Aug. 30, 2016, 25 pages.
Final Office Action from U.S. Appl. No. 14/673,551, dated Feb. 23, 2017, 36 pages.
Final Office Action from U.S. Appl. No. 14/673,551, dated Jan. 9, 2018, 24 pages.
Final Office Action from U.S. Appl. No. 14/799,436, dated Nov. 28, 2017, 19 pages.
Final Office Action from U.S. Appl. No. 14/927,732, dated Apr. 27, 2017, 35 pages.
Final Office Action from U.S. Appl. No. 14/967,702, dated Dec. 22, 2017, 22 pages.
Final Office Action from U.S. Appl. No. 15/670,306, dated Sep. 20, 2018, 21 pages.
Galeev, "Bluetooth 4.0: An introduction to Bluetooth Low Energy" (Part I and II), EETimes, accessed on eetimes.com, Jul. 2011, 14 pages.
Hasbro Playskool Alphie Toy; 2009, downloaded from http://www.hasbro.com/common/documents/dad2af771c4311ddbd0b0800200c9a66/6135ABCA1989F369034808DE78694FF.pdf, 5 pages.
IBM, "The IBM vision of a smarter home enabled by cloud technology", Global Electronics Industry, white paper Sep. 2010, 16 pages.
International Preliminary Report on Patentability for Application No. PCT/US2015/061308, dated Jun. 1, 2017, 13 pages.
International Preliminary Report on Patentability for Application No. PCT/US2015/065539, dated Jun. 29, 2017, 17 pages.
International Preliminary Report on Patentability for Application No. PCT/US2016/035161, dated Dec. 14, 2017, 8 pages.
International Preliminary Report on Patentability for Application No. PCT/US2016/040819, dated Jan. 18, 2018, 9 pages.
International Preliminary Report on Patentability for Application No. PCT/US2016/25069, dated Oct. 12, 2017, 10 pages.
International Search Report and Written Opinion for Application No. PCT/US16/25069, dated Jul. 1, 2016, 11 pages.
International Search Report and Written Opinion for Application No. PCT/US2015/061308, dated Mar. 16, 2016, 16 pages.
International Search Report and Written Opinion for Application No. PCT/US2015/065539, dated Feb. 12, 2016, 19 pages.
International Search Report and Written Opinion for Application No. PCT/US2016/035161, dated Aug. 31, 2016, 9 pages.
International Search Report and Written opinion for Application No. PCT/US2016/040819, dated Oct. 31, 2016, 12 pages.

(56) References Cited

OTHER PUBLICATIONS

Kainda et al., Usability and Security of Out-of-Band Channels in Secure Device Pairing Protocols, Symposium on Usable Privacy and Security (SOUPS) Jul. 2009, 12 pages.
Non-Final Office Action from U.S. Appl. No. 15/824,173, dated Apr. 3, 2018, 12 pages.
Non-Final Office Action from U.S. Appl. No. 14/550,667 dated Dec. 17, 2015, 10 pages.
Non-Final Office Action from U.S. Appl. No. 14/550,775, dated Oct. 6, 2017, 19 pages.
Non-Final Office Action from U.S. Appl. No. 14/550,775 dated Sep. 21, 2016, 19 pages.
Non-Final Office Action from U.S. Appl. No. 14/575,463 dated Mar. 11, 2016, 23 pages.
Non-Final Office Action from U.S. Appl. No. 14/575,535 dated Aug. 12, 2016, 11 pages.
Non-Final Office Action from U.S. Appl. No. 14/673,551, dated Aug. 25, 2017, 24 pages.
Non-Final Office Action from U.S. Appl. No. 14/673,551, dated Oct. 21, 2016, 27 pages.
Non-Final Office Action from U.S. Appl. No. 14/673,582 dated Nov. 3, 2016, 6 pages.
Non-Final Office Action from U.S. Appl. No. 14/727,811 dated Sep. 23, 2016, 17 pages.
Non-Final Office Action from U.S. Appl. No. 14/791,371 dated Nov. 4, 2016, 16 pages.
Non-Final Office Action from U.S. Appl. No. 14/791,373, dated Dec. 30, 2016, 18 pages.
Non-Final Office Action from U.S. Appl. No. 14/799,436, dated Mar. 24, 2017, 32 pages.
Non-Final Office Action from U.S. Appl. No. 14/927,732 dated Aug. 15, 2016, 14 pages.
Non-Final Office Action from U.S. Appl. No. 14/927,732 dated Dec. 5, 2016, 16 pages.
Non-Final Office Action from U.S. Appl. No. 14/967,702, dated Jul. 25, 2017, 34 pages.
Non-Final Office Action from U.S. Appl. No. 15/670,306, dated Dec. 29, 2017, 37 pages.
Notice of Allowance from U.S. Appl. No. 15/824,173, dated Nov. 9, 2018, 16 pages.
Notice of Allowance from U.S. Appl. No. 14/799,436, dated Apr. 6, 2018, 18 pages.
Notice of Allowance from U.S. Appl. No. 14/550,667, dated Jul. 11, 2016, 9 pages.
Notice of Allowance from U.S. Appl. No. 14/550,667, dated Oct. 7, 2016, 3 pages.
Notice of Allowance from U.S. Appl. No. 14/550,735, dated Dec. 22, 2016, 11 pages.
Non-Final Office Action from U.S. Appl. No. 14/550,775, dated Dec. 21, 2018, 20 pages.
Notice of Allowance from U.S. Appl. No. 15/824,173, dated Feb. 25, 2019, 36 pages.
Abandonment from U.S. Appl. No. 16/025,951, dated Apr. 2, 2019, 2 pages.
Final Office Action from U.S. Appl. No. 14/550,775, dated Jun. 14, 2019, 24 pages.
Notice of Allowance from U.S. Appl. No. 15/670,306, dated Apr. 23, 2019, 14 pages.
Kato et al., "A method for providing a robot service on an Internet service Platform", Information Processing Society of Japan, Feb. 15, 2013, vol. 54, No. 2, pp. 659-671 (English Abstract Submitted).
Notice of Reasons for Refusal, JP App. No. 2017-527371, dated Sep. 24, 2019, 12 pages (7 pages of English Translation and 5 pages of Original Document).
First Office Action, CN App. No. 201580062819.3, dated Nov. 5, 2019, 21 pages (11 pages of English Translation and 10 pages of Original Document).
First Office Action, CN App. No. 201580069097.4, dated Mar. 20, 2020, 11 pages (5 pages of English Translation and 6 pages of Original Document).
First Office Action, CN App. No. 201680020486.2, dated May 22, 2020, 13 pages (7 pages of English Translation and 6 pages of Original Document).
JavaScript Tessel Node, "I got a microcomputer board Tessel that runs various hardware modules with JavaScript (Node.js), so I examined it in detail", Jul. 6, 2014, 20 pages.
Matsumoto et al., "Protocols for Supporting IoT Period "MQTT" (Part 1, 2, 3 and 4)", available online at <https://codezine.jp/article/detail/8020>, Sep. 30, 2014, 15 pages.
Notice of Reasons for Refusal, JP App. No. 2017-527371, dated May 11, 2020, 5 pages (3 pages of English Translation and 2 pages of Original Document).
Second Office Action, CN App. No. 201580062819.3, dated Jul. 8, 2020, 14 pages (7 pages of English Translation and 7 pages of Original Document).

* cited by examiner

SYSTEM AND METHOD FOR ACCURATELY SENSING USER LOCATION IN AN IOT SYSTEM

BACKGROUND

Field of the Invention

This invention relates generally to the field of computer systems. More particularly, the invention relates to a system and method for accurately sensing user location in an IoT system.

Description of the Related Art

The "Internet of Things" refers to the interconnection of uniquely-identifiable embedded devices within the Internet infrastructure. Ultimately, IoT is expected to result in new, wide-ranging types of applications in which virtually any type of physical thing may provide information about itself or its surroundings and/or may be controlled remotely via client devices over the Internet.

IoT development and adoption has been slow due to issues related to connectivity, power, and a lack of standardization. For example, one obstacle to IoT development and adoption is that no standard platform exists to allow developers to design and offer new IoT devices and services. In order enter into the IoT market, a developer must design the entire IoT platform from the ground up, including the network protocols and infrastructure, hardware, software and services required to support the desired IoT implementation. As a result, each provider of IoT devices uses proprietary techniques for designing and connecting the IoT devices, making the adoption of multiple types of IoT devices burdensome for end users. Another obstacle to IoT adoption is the difficulty associated with connecting and powering IoT devices. Connecting appliances such as refrigerators, garage door openers, environmental sensors, home security sensors/controllers, etc, for example, requires an electrical source to power each connected IoT device, and such an electrical source is often not conveniently located.

Another problem which exists is that the wireless technologies used to interconnect IoT devices such as Bluetooth LE are generally short range technologies. Thus, if the data collection hub for an IoT implementation is outside the range of an IoT device, the IoT device will not be able to transmit data to the IoT hub (and vice versa). Consequently, techniques are needed which would allow an IoT device to provide data to an IoT hub (or other IoT device) which is out of range.

BRIEF DESCRIPTION OF THE DRAWINGS

A better understanding of the present invention can be obtained from the following detailed description in conjunction with the following drawings, in which.

DETAILED DESCRIPTION

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

One embodiment of the invention comprises an Internet of Things (IoT) platform which may be utilized by developers to design and build new IoT devices and applications. In particular, one embodiment includes a base hardware/software platform for IoT devices including a predefined networking protocol stack and an IoT hub through which the IoT devices are coupled to the Internet. In addition, one embodiment includes an IoT service through which the IoT hubs and connected IoT devices may be accessed and managed as described below. In addition, one embodiment of the IoT platform includes an IoT app or Web application (e.g., executed on a client device) to access and configured the IoT service, hub and connected devices. Existing online retailers and other Website operators may leverage the IoT platform described herein to readily provide unique IoT functionality to existing user bases.

Figure 1A:
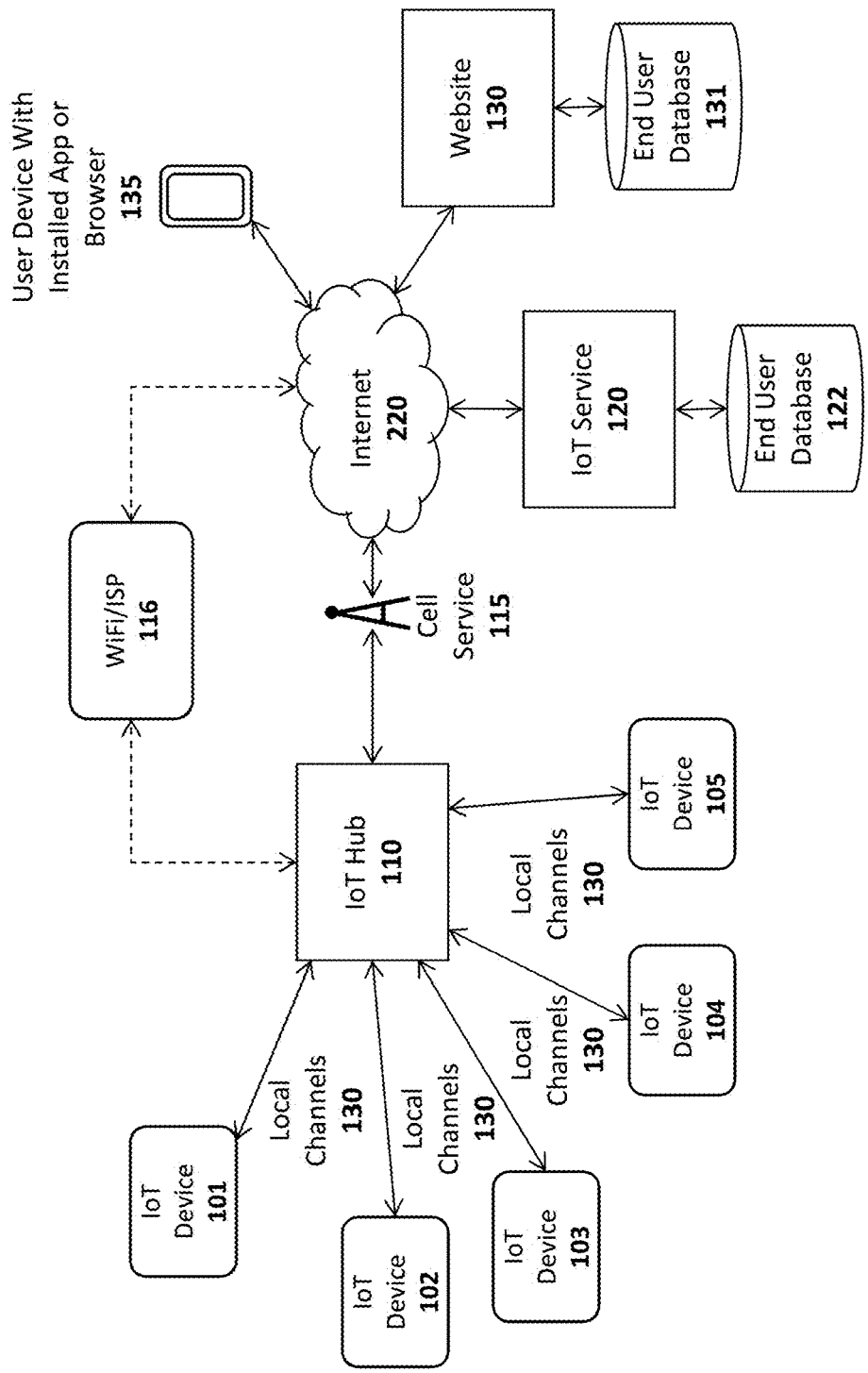
FIGS. 1A-B illustrates different embodiments of an IoT system architecture.

FIG. 1A illustrates an overview of an architectural platform on which embodiments of the invention may be implemented. In particular, the illustrated embodiment includes a plurality of IoT devices 101-105 communicatively coupled over local communication channels 130 to a central IoT hub 110 which is itself communicatively coupled to an IoT service 120 over the Internet 220. Each of the IoT devices 101-105 may initially be paired to the IoT hub 110 (e.g., using the pairing techniques described below) in order to enable each of the local communication channels 130. In one embodiment, the IoT service 120 includes an end user database 122 for maintaining user account information and data collected from each user's IoT devices. For example, if the IoT devices include sensors (e.g., temperature sensors, accelerometers, heat sensors, motion detectore, etc), the database 122 may be continually updated to store the data collected by the IoT devices 101-105. The data stored in the database 122 may then be made accessible to the end user via the IoT app or browser installed on the user's device 135 (or via a desktop or other client computer system) and to web clients (e.g., such as websites 130 subscribing to the IoT service 120).

The IoT devices 101-105 may be equipped with various types of sensors to collect information about themselves and their surroundings and provide the collected information to the IoT service 120, user devices 135 and/or external Websites 130 via the IoT hub 110. Some of the IoT devices 101-105 may perform a specified function in response to control commands sent through the IoT hub 110. Various specific examples of information collected by the IoT devices 101-105 and control commands are provided below. In one embodiment described below, the IoT device 101 is a user input device designed to record user selections and send the user selections to the IoT service 120 and/or Website.

In one embodiment, the IoT hub 110 includes a cellular radio to establish a connection to the Internet 220 via a cellular service 115 such as a 4G (e.g., Mobile WiMAX, LTE) or 5G cellular data service. Alternatively, or in addition, the IoT hub 110 may include a WiFi radio to establish a WiFi connection through a WiFi access point or router 116 which couples the IoT hub 110 to the Internet (e.g., via an Internet Service Provider providing Internet service to the end user). Of course, it should be noted that the underlying principles of the invention are not limited to any particular type of communication channel or protocol.

In one embodiment, the IoT devices 101-105 are ultra low-power devices capable of operating for extended periods of time on battery power (e.g., years). To conserve power, the local communication channels 130 may be implemented using a low-power wireless communication technology such as Bluetooth Low Energy (LE). In this embodiment, each of the IoT devices 101-105 and the IoT hub 110 are equipped with Bluetooth LE radios and protocol stacks.

As mentioned, in one embodiment, the IoT platform includes an IoT app or Web application executed on user devices 135 to allow users to access and configure the connected IoT devices 101-105, IoT hub 110, and/or IoT service 120. In one embodiment, the app or web application may be designed by the operator of a Website 130 to provide IoT functionality to its user base. As illustrated, the Website may maintain a user database 131 containing account records related to each user.

Figure 1B:
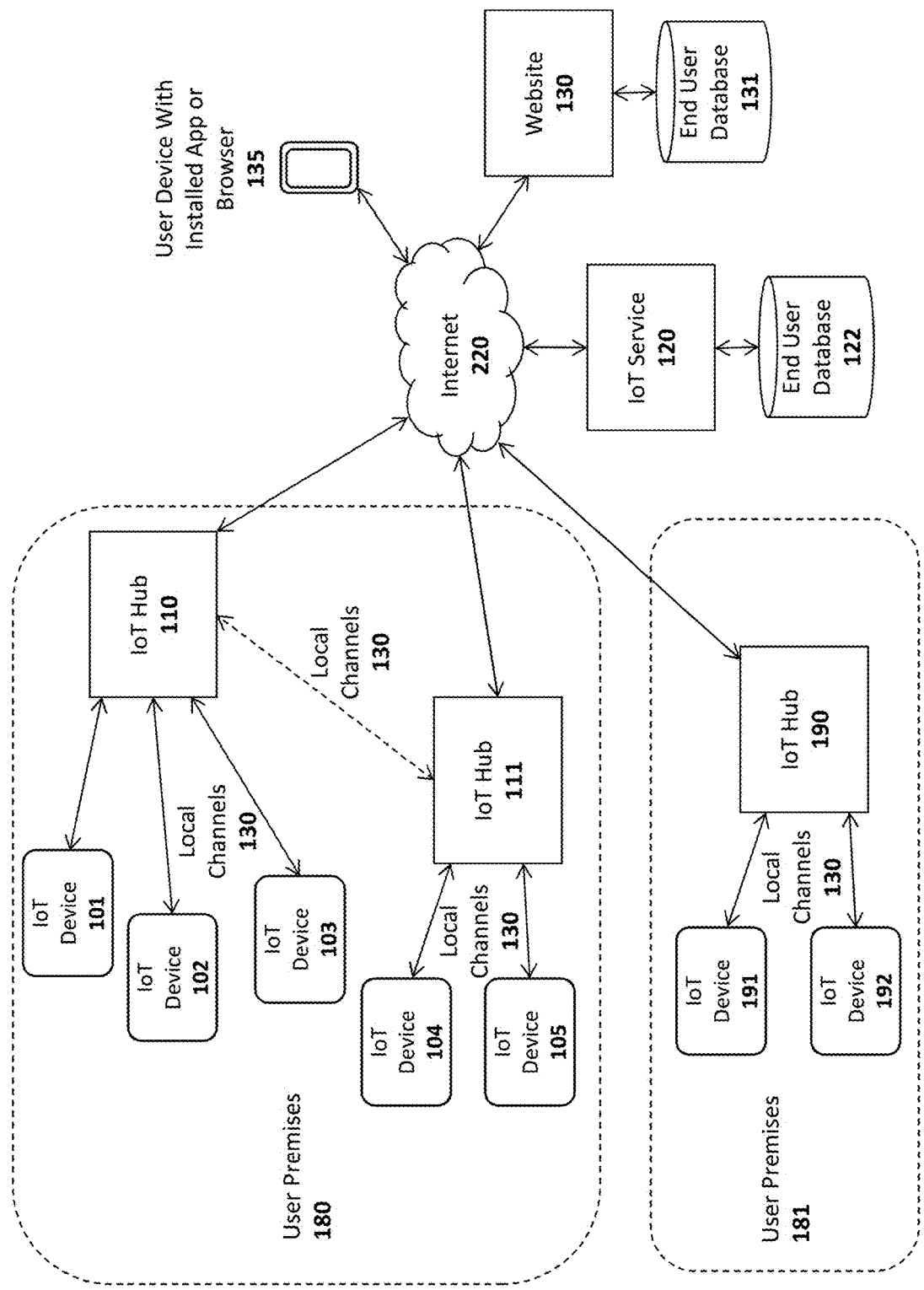

FIG. 1B illustrates additional connection options for a plurality of IoT hubs 110-111, 190 In this embodiment a single user may have multiple hubs 110-111 installed onsite at a single user premises 180 (e.g., the user's home or business). This may be done, for example, to extend the wireless range needed to connect all of the IoT devices 101-105. As indicated, if a user has multiple hubs 110, 111 they may be connected via a local communication channel (e.g., Wifi, Ethernet, Power Line Networking, etc). In one embodiment, each of the hubs 110-111 may establish a direct connection to the IoT service 120 through a cellular 115 or WiFi 116 connection (not explicitly shown in FIG. 1B). Alternatively, or in addition, one of the IoT hubs such as IoT hub 110 may act as a "master" hub which provides connectivity and/or local services to all of the other IoT hubs on the user premises 180, such as IoT hub 111 (as indicated by the dotted line connecting IoT hub 110 and IoT hub 111). For example, the master IoT hub 110 may be the only IoT hub to establish a direct connection to the IoT service 120. In one embodiment, only the "master" IoT hub 110 is equipped with a cellular communication interface to establish the connection to the IoT service 120. As such, all communication between the IoT service 120 and the other IoT hubs 111 will flow through the master IoT hub 110. In this role, the master IoT hub 110 may be provided with additional program code to perform filtering operations on the data exchanged between the other IoT hubs 111 and IoT service 120 (e.g., servicing some data requests locally when possible).

Regardless of how the IoT hubs 110-111 are connected, in one embodiment, the IoT service 120 will logically associate the hubs with the user and combine all of the attached IoT devices 101-105 under a single comprehensive user interface, accessible via a user device with the installed app 135 (and/or a browser-based interface).

In this embodiment, the master IoT hub 110 and one or more slave IoT hubs 111 may connect over a local network which may be a WiFi network 116, an Ethernet network, and/or a using power-line communications (PLC) networking (e.g., where all or portions of the network are run through the user's power lines). In addition, to the IoT hubs 110-111, each of the IoT devices 101-105 may be interconnected with the IoT hubs 110-111 using any type of local network channel such as WiFi, Ethernet, PLC, or Bluetooth LE, to name a few.

FIG. 1B also shows an IoT hub 190 installed at a second user premises 181. A virtually unlimited number of such IoT hubs 190 may be installed and configured to collect data from IoT devices 191-192 at user premises around the world. In one embodiment, the two user premises 180-181 may be configured for the same user. For example, one user premises 180 may be the user's primary home and the other user premises 181 may be the user's vacation home. In such a case, the IoT service 120 will logically associate the IoT hubs 110-111, 190 with the user and combine all of the attached IoT devices 101-105, 191-192 under a single comprehensive user interface, accessible via a user device with the installed app 135 (and/or a browser-based interface).

Figure 2:
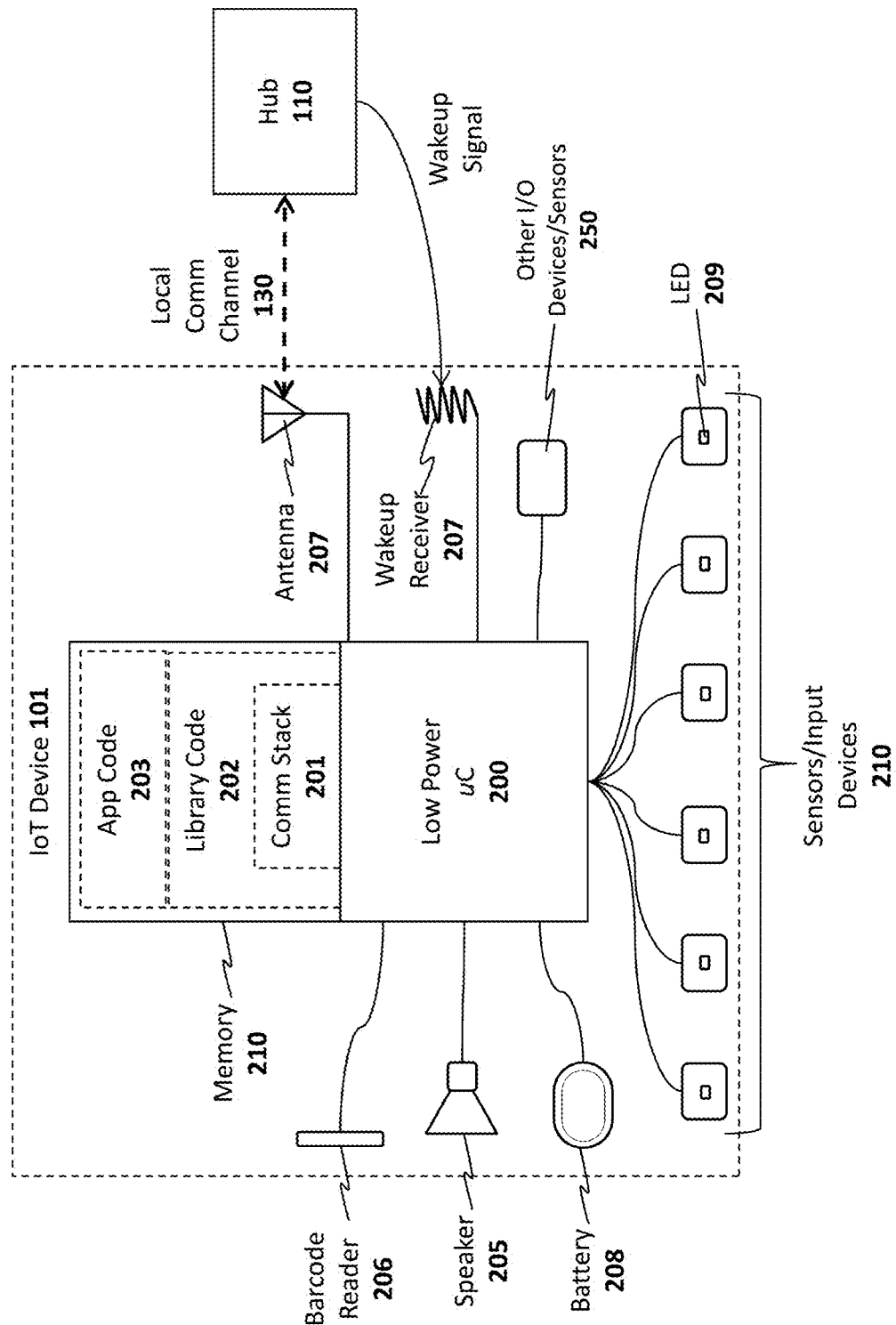
FIG. 2 illustrates an IoT device in accordance with one embodiment of the invention.

As illustrated in FIG. 2, an exemplary embodiment of an IoT device 101 includes a memory 210 for storing program code and data 201-203 and a low power microcontroller 200 for executing the program code and processing the data. The memory 210 may be a volatile memory such as dynamic random access memory (DRAM) or may be a non-volatile memory such as Flash memory. In one embodiment, a non-volatile memory may be used for persistent storage and a volatile memory may be used for execution of the program code and data at runtime. Moreover, the memory 210 may be integrated within the low power microcontroller 200 or may be coupled to the low power microcontroller 200 via a bus or communication fabric. The underlying principles of the invention are not limited to any particular implementation of the memory 210.

As illustrated, the program code may include application program code 203 defining an application-specific set of functions to be performed by the IoT device 201 and library code 202 comprising a set of predefined building blocks which may be utilized by the application developer of the IoT device 101. In one embodiment, the library code 202 comprises a set of basic functions required to implement an IoT device such as a communication protocol stack 201 for enabling communication between each IoT device 101 and the IoT hub 110. As mentioned, in one embodiment, the communication protocol stack 201 comprises a Bluetooth LE protocol stack. In this embodiment, Bluetooth LE radio and antenna 207 may be integrated within the low power microcontroller 200. However, the underlying principles of the invention are not limited to any particular communication protocol.

The particular embodiment shown in FIG. 2 also includes a plurality of input devices or sensors 210 to receive user input and provide the user input to the low power microcontroller, which processes the user input in accordance with the application code 203 and library code 202. In one embodiment, each of the input devices include an LED 209 to provide feedback to the end user.

In addition, the illustrated embodiment includes a battery 208 for supplying power to the low power microcontroller. In one embodiment, a non-chargeable coin cell battery is used. However, in an alternate embodiment, an integrated rechargeable battery may be used (e.g., rechargeable by connecting the IoT device to an AC power supply (not shown)).

A speaker 205 is also provided for generating audio. In one embodiment, the low power microcontroller 299 includes audio decoding logic for decoding a compressed audio stream (e.g., such as an MPEG-4/Advanced Audio Coding (AAC) stream) to generate audio on the speaker 205. Alternatively, the low power microcontroller 200 and/or the application code/data 203 may include digitally sampled snippets of audio to provide verbal feedback to the end user as the user enters selections via the input devices 210.

In one embodiment, one or more other/alternate I/O devices or sensors 250 may be included on the IoT device 101 based on the particular application for which the IoT device 101 is designed. For example, an environmental sensor may be included to measure temperature, pressure, humidity, etc. A security sensor and/or door lock opener may be included if the IoT device is used as a security device. Of course, these examples are provided merely for the purposes of illustration. The underlying principles of the invention are not limited to any particular type of IoT device. In fact, given the highly programmable nature of the low power microcontroller 200 equipped with the library code 202, an application developer may readily develop new application code 203 and new I/O devices 250 to interface with the low power microcontroller for virtually any type of IoT application.

In one embodiment, the low power microcontroller 200 also includes a secure key store for storing encryption keys for encrypting communications and/or generating signatures. Alternatively, the keys may be secured in a subscriber identity module (SIM).

Figure 3:
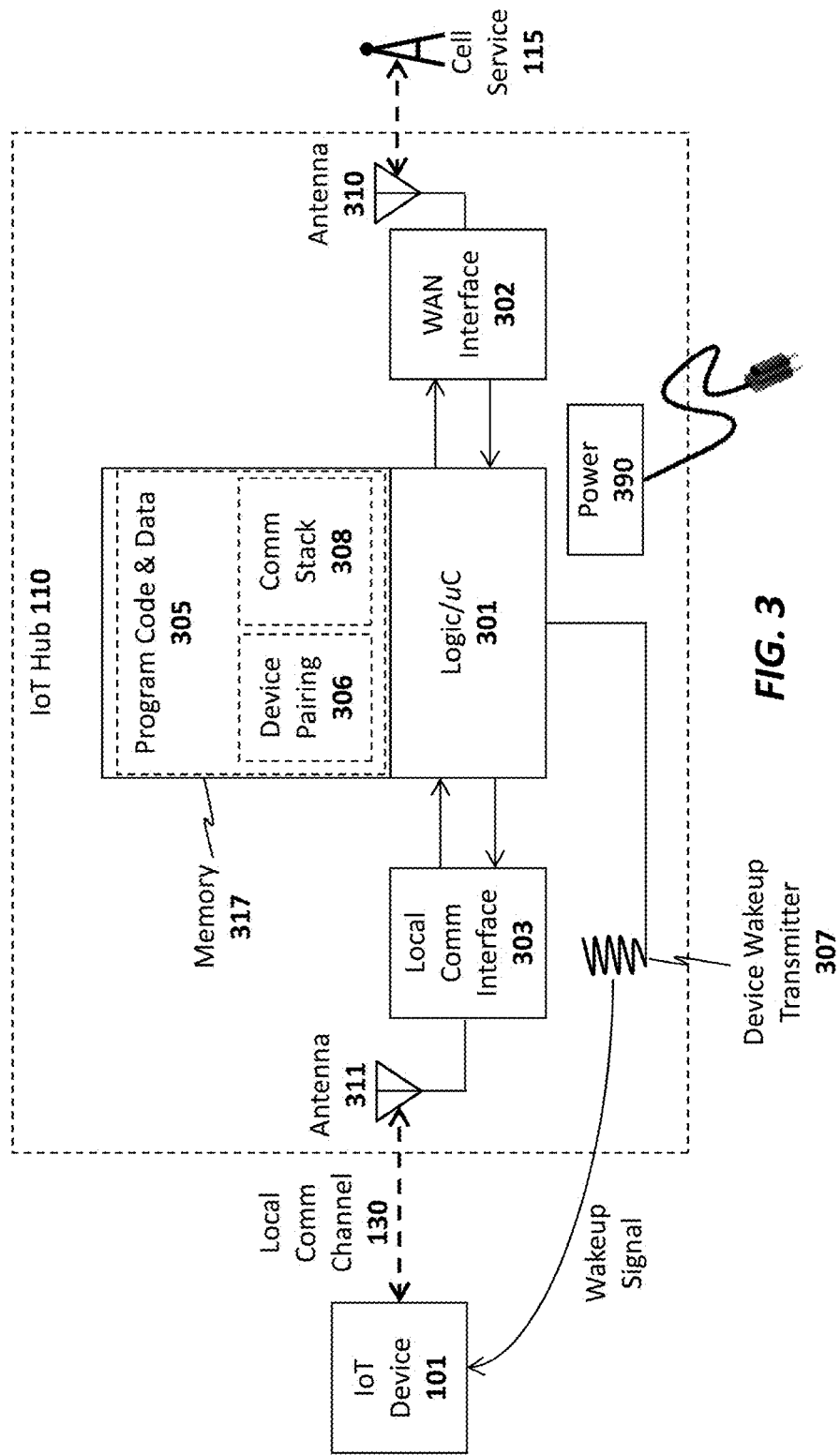
FIG. 3 illustrates an IoT hub in accordance with one embodiment of the invention.

A wakeup receiver 207 is included in one embodiment to wake the IoT device from an ultra low power state in which it is consuming virtually no power. In one embodiment, the wakeup receiver 207 is configured to cause the IoT device 101 to exit this low power state in response to a wakeup signal received from a wakeup transmitter 307 configured on the IoT hub 110 as shown in FIG. 3. In particular, in one embodiment, the transmitter 307 and receiver 207 together form an electrical resonant transformer circuit such as a Tesla coil. In operation, energy is transmitted via radio frequency signals from the transmitter 307 to the receiver 207 when the hub 110 needs to wake the IoT device 101 from a very low power state. Because of the energy transfer, the IoT device 101 may be configured to consume virtually no power when it is in its low power state because it does not need to continually "listen" for a signal from the hub (as is the case with network protocols which allow devices to be awakened via a network signal). Rather, the microcontroller 200 of the IoT device 101 may be configured to wake up after being effectively powered down by using the energy electrically transmitted from the transmitter 307 to the receiver 207.

As illustrated in FIG. 3, the IoT hub 110 also includes a memory 317 for storing program code and data 305 and hardware logic 301 such as a microcontroller for executing the program code and processing the data. A wide area network (WAN) interface 302 and antenna 310 couple the IoT hub 110 to the cellular service 115. Alternatively, as mentioned above, the IoT hub 110 may also include a local network interface (not shown) such as a WiFi interface (and WiFi antenna) or Ethernet interface for establishing a local area network communication channel. In one embodiment, the hardware logic 301 also includes a secure key store for storing encryption keys for encrypting communications and generating/verifying signatures. Alternatively, the keys may be secured in a subscriber identiy module (SIM).

A local communication interface 303 and antenna 311 establishes local communication channels with each of the IoT devices 101-105. As mentioned above, in one embodiment, the local communication interface 303/antenna 311 implements the Bluetooth LE standard. However, the underlying principles of the invention are not limited to any particular protocols for establishing the local communication channels with the IoT devices 101-105. Although illustrated as separate units in FIG. 3, the WAN interface 302 and/or local communication interface 303 may be embedded within the same chip as the hardware logic 301.

In one embodiment, the program code and data includes a communication protocol stack 308 which may include separate stacks for communicating over the local communication interface 303 and the WAN interface 302. In addition, device pairing program code and data 306 may be stored in the memory to allow the IoT hub to pair with new IoT devices. In one embodiment, each new IoT device 101-105 is assigned a unique code which is communicated to the IoT hub 110 during the pairing process. For example, the unique code may be embedded in a barcode on the IoT device and may be read by the barcode reader 106 or may be communicated over the local communication channel 130. In an alternate embodiment, the unique ID code is embedded magnetically on the IoT device and the IoT hub has a magnetic sensor such as an radio frequency ID (RFID) or near field communication (NFC) sensor to detect the code when the IoT device 101 is moved within a few inches of the IoT hub 110.

In one embodiment, once the unique ID has been communicated, the IoT hub 110 may verify the unique ID by querying a local database (not shown), performing a hash to verify that the code is acceptable, and/or communicating with the IoT service 120, user device 135 and/or Website 130 to validate the ID code. Once validated, in one embodiment, the IoT hub 110 pairs the IoT device 101 and stores the pairing data in memory 317 (which, as mentioned, may include non-volatile memory). Once pairing is complete, the IoT hub 110 may connect with the IoT device 101 to perform the various IoT functions described herein.

In one embodiment, the organization running the IoT service 120 may provide the IoT hub 110 and a basic hardware/software platform to allow developers to easily design new IoT services. In particular, in addition to the IoT hub 110, developers may be provided with a software development kit (SDK) to update the program code and data 305 executed within the hub 110. In addition, for IoT devices 101, the SDK may include an extensive set of library code 202 designed for the base IoT hardware (e.g., the low power microcontroller 200 and other components shown in FIG. 2) to facilitate the design of various different types of applications 101. In one embodiment, the SDK includes a graphical design interface in which the developer needs only to specify input and outputs for the IoT device. All of the networking code, including the communication stack 201 that allows the IoT device 101 to connect to the hub 110 and the service 120, is already in place for the developer. In addition, in one embodiment, the SDK also includes a library code base to facilitate the design of apps for mobile devices (e.g., iPhone and Android devices).

In one embodiment, the IoT hub 110 manages a continuous bi-directional stream of data between the IoT devices 101-105 and the IoT service 120. In circumstances where updates to/from the IoT devices 101-105 are required in real time (e.g., where a user needs to view the current status of security devices or environmental readings), the IoT hub may maintain an open TCP socket to provide regular updates to the user device 135 and/or external Websites 130. The specific networking protocol used to provide updates may be tweaked based on the needs of the underlying application. For example, in some cases, where may not make sense to have a continuous bi-directional stream, a simple request/response protocol may be used to gather information when needed.

In one embodiment, both the IoT hub 110 and the IoT devices 101-105 are automatically upgradeable over the network. In particular, when a new update is available for the IoT hub 110 it may automatically download and install the update from the IoT service 120. It may first copy the updated code into a local memory, run and verify the update before swapping out the older program code. Similarly, when updates are available for each of the IoT devices 101-105, they may initially be downloaded by the IoT hub 110 and pushed out to each of the IoT devices 101-105. Each IoT device 101-105 may then apply the update in a similar manner as described above for the IoT hub and report back the results of the update to the IoT hub 110. If the update is successful, then the IoT hub 110 may delete the update from its memory and record the latest version of code installed on each IoT device (e.g., so that it may continue to check for new updates for each IoT device).

In one embodiment, the IoT hub 110 is powered via A/C power. In particular, the IoT hub 110 may include a power unit 390 with a transformer for transforming A/C voltage supplied via an A/C power cord to a lower DC voltage.

Figure 4A:
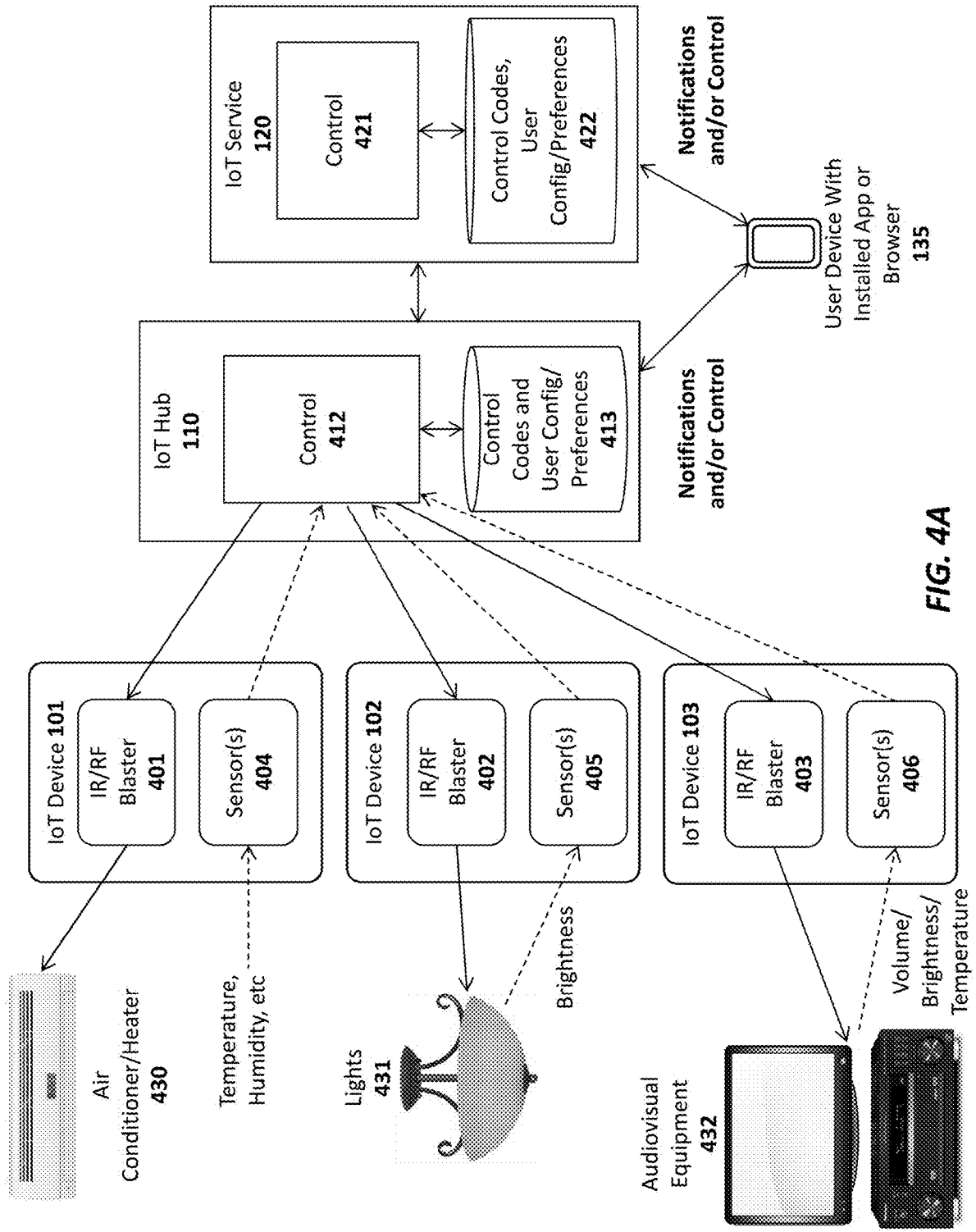
FIG. 4A-B illustrate embodiments of the invention for controlling and collecting data from IoT devices, and generating notifications.

FIG. 4A illustrates one embodiment of the invention for performing universal remote control operations using the IoT system. In particular, in this embodiment, a set of IoT devices 101-103 are equipped with infrared (IR) and/or radio frequency (RF) blasters 401-403, respectively, for transmitting remote control codes to control various different types of electronics equipment including air conditioners/heaters 430, lighting systems 431, and audiovisual equipment 432 (to name just a few). In the embodiment shown in FIG. 4A, the IoT devices 101-103 are also equipped with sensors 404-406, respectively, for detecting the operation of the devices which they control, as described below.

For example, sensor 404 in IoT device 101 may be a temperature and/or humidity sensor for sensing the current temperature/humidity and responsively controlling the air conditioner/heater 430 based on a current desired temperature. In this embodiment, the air conditioner/heater 430 is one which is designed to be controlled via a remote control device (typically a remote control which itself has a temperature sensor embedded therein). In one embodiment, the user provides the desired temperature to the IoT hub 110 via an app or browser installed on a user device 135. Control logic 412 executed on the IoT hub 110 receives the current temperature/humidity data from the sensor 404 and responsively transmits commands to the IoT device 101 to control the IR/RF blaster 401 in accordance with the desired temperature/humidity. For example, if the temperature is below the desired temperature, then the control logic 412 may transmit a command to the air conditioner/heater via the IR/RF blaster 401 to increase the temperature (e.g., either by turning off the air conditioner or turning on the heater). The command may include the necessary remote control code stored in a database 413 on the IoT hub 110. Alternatively, or in addition, the IoT service 421 may implement control logic 421 to control the electronics equipment 430-432 based on specified user preferences and stored control codes 422.

IoT device 102 in the illustrated example is used to control lighting 431. In particular, sensor 405 in IoT device 102 may photosensor or photodetector configured to detect the current brightness of the light being produced by a light fixture 431 (or other lighting apparatus). The user may specify a desired lighting level (including an indication of ON or OFF) to the IoT hub 110 via the user device 135. In response, the control logic 412 will transmit commands to the IR/RF blaster 402 to control the current brightness level of the lights 431 (e.g., increasing the lighting if the current brightness is too low or decreasing the lighting if the current brightness is too high; or simply turning the lights ON or OFF).

IoT device 103 in the illustrated example is configured to control audiovisual equipment 432 (e.g., a television, A/V receiver, cable/satellite receiver, AppleTV™, etc). Sensor 406 in IoT device 103 may be an audio sensor (e.g., a microphone and associated logic) for detecting a current ambient volume level and/or a photosensor to detect whether a television is on or off based on the light generated by the television (e.g., by measuring the light within a specified spectrum). Alternatively, sensor 406 may include a temperature sensor connected to the audiovisual equipment to detect whether the audio equipment is on or off based on the detected temperature. Once again, in response to user input via the user device 135, the control logic 412 may transmit commands to the audiovisual equipment via the IR blaster 403 of the IoT device 103.

It should be noted that the foregoing are merely illustrative examples of one embodiment of the invention. The underlying principles of the invention are not limited to any particular type of sensors or equipment to be controlled by IoT devices.

In an embodiment in which the IoT devices 101-103 are coupled to the IoT hub 110 via a Bluetooth LE connection, the sensor data and commands are sent over the Bluetooth LE channel. However, the underlying principles of the invention are not limited to Bluetooth LE or any other communication standard.

Figure 4B:
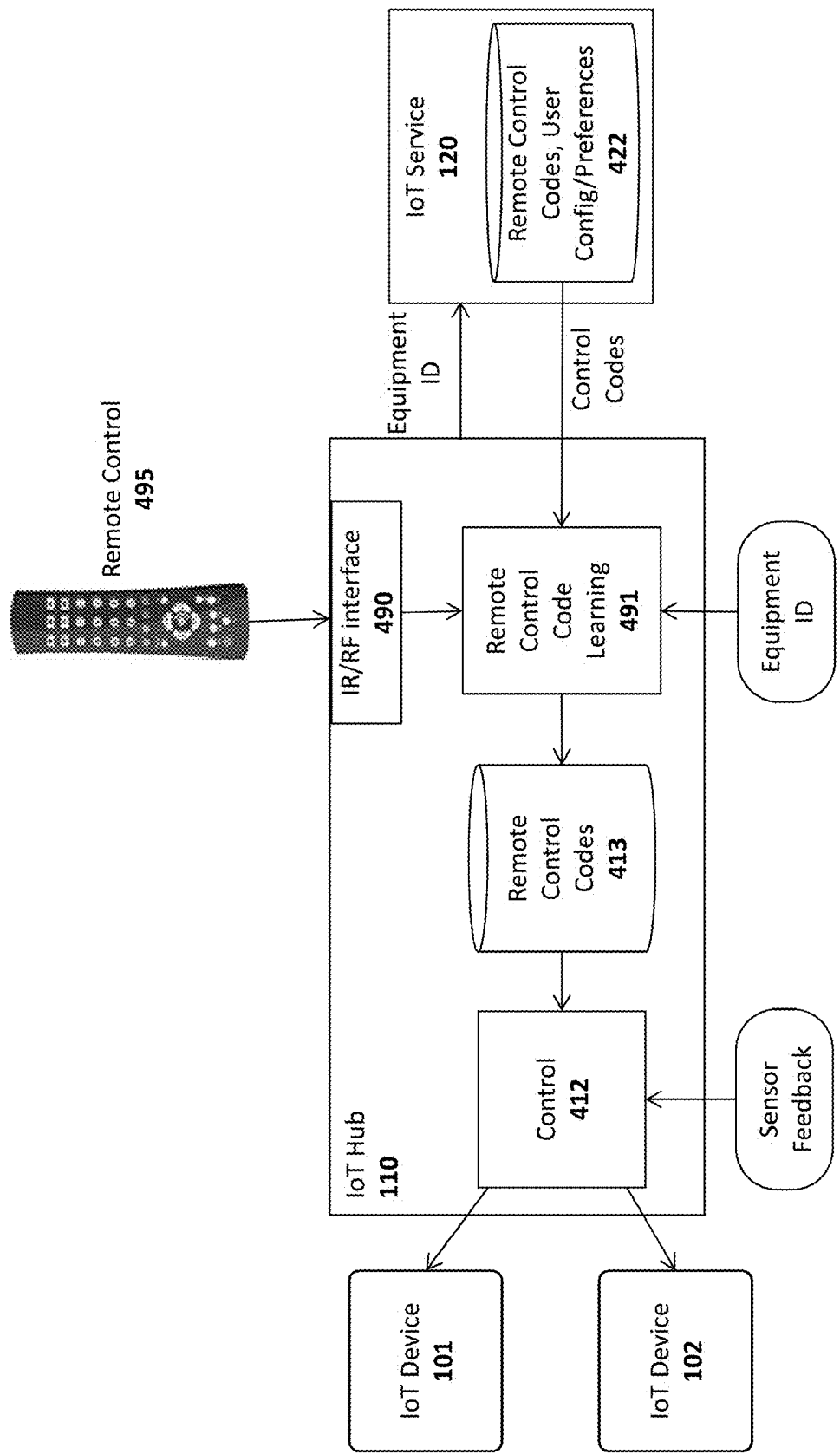

In one embodiment, the control codes required to control each of the pieces of electronics equipment are stored in a database 413 on the IoT hub 110 and/or a database 422 on the IoT service 120. As illustrated in FIG. 4B, the control codes may be provided to the IoT hub 110 from a master database of control codes 422 for different pieces of equipment maintained on the IoT service 120. The end user may specify the types of electronic (or other) equipment to be controlled via the app or browser executed on the user device 135 and, in response, a remote control code learning module 491 on the IoT hub may retrieve the required IR/RF codes from the remote control code database 492 on the IoT service 120 (e.g., identifying each piece of electronic equipment with a unique ID).

In addition, in one embodiment, the IoT hub 110 is equipped with an IR/RF interface 490 to allow the remote control code learning module 491 to "learn" new remote control codes directly from the original remote control 495 provided with the electronic equipment. For example, if control codes for the original remote control provided with the air conditioner 430 is not included in the remote control database, the user may interact with the IoT hub 110 via the app/browser on the user device 135 to teach the IoT hub 110 the various control codes generated by the original remote control (e.g., increase temperature, decrease temperature, etc). Once the remote control codes are learned they may be stored in the control code database 413 on the IoT hub 110 and/or sent back to the IoT service 120 to be included in the central remote control code database 492 (and subsequently used by other users with the same air conditioner unit 430).

In one embodiment, each of the IoT devices 101-103 have an extremely small form factor and may be affixed on or near their respective electronics equipment 430-432 using double-sided tape, a small nail, a magnetic attachment, etc. For control of a piece of equipment such as the air conditioner 430, it would be desirable to place the IoT device 101 sufficiently far away so that the sensor 404 can accurately measure the ambient temperature in the home (e.g., placing the IoT device directly on the air conditioner would result in a temperature measurement which would be too low when the air conditioner was running or too high when the heater was running). In contrast, the IoT device 102 used for controlling lighting may be placed on or near the lighting fixture 431 for the sensor 405 to detect the current lighting level.

In addition to providing general control functions as described, one embodiment of the IoT hub 110 and/or IoT service 120 transmits notifications to the end user related to the current status of each piece of electronics equipment. The notifications, which may be text messages and/or app-specific notifications, may then be displayed on the display of the user's mobile device 135. For example, if the user's air conditioner has been on for an extended period of time but the temperature has not changed, the IoT hub 110 and/or IoT service 120 may send the user a notification that the air conditioner is not functioning properly. If the user is not home (which may be detected via motion sensors or based on the user's current detected location), and the sensors 406 indicate that audiovisual equipment 430 is on or sensors 405 indicate that the lights are on, then a notification may be sent to the user, asking if the user would like to turn off the audiovisual equipment 432 and/or lights 431. The same type of notification may be sent for any equipment type.

Once the user receives a notification, he/she may remotely control the electronics equipment 430-432 via the app or browser on the user device 135. In one embodiment, the user device 135 is a touchscreen device and the app or browser displays an image of a remote control with user-selectable buttons for controlling the equipment 430-432. Upon receiving a notification, the user may open the graphical remote control and turn off or adjust the various different pieces of equipment. If connected via the IoT service 120, the user's selections may be forwarded from the IoT service 120 to the IoT hub 110 which will then control the equipment via the control logic 412. Alternatively, the user input may be sent directly to the IoT hub 110 from the user device 135.

In one embodiment, the user may program the control logic 412 on the IoT hub 110 to perform various automatic control functions with respect to the electronics equipment 430-432. In addition to maintaining a desired temperature, brightness level, and volume level as described above, the control logic 412 may automatically turn off the electronics equipment if certain conditions are detected. For example, if the control logic 412 detects that the user is not home and that the air conditioner is not functioning, it may automatically turn off the air conditioner. Similarly, if the user is not home, and the sensors 406 indicate that audiovisual equipment 430 is on or sensors 405 indicate that the lights are on, then the control logic 412 may automatically transmit commands via the IR/RF blasters 403 and 402, to turn off the audiovisual equipment and lights, respectively.

Figure 5:
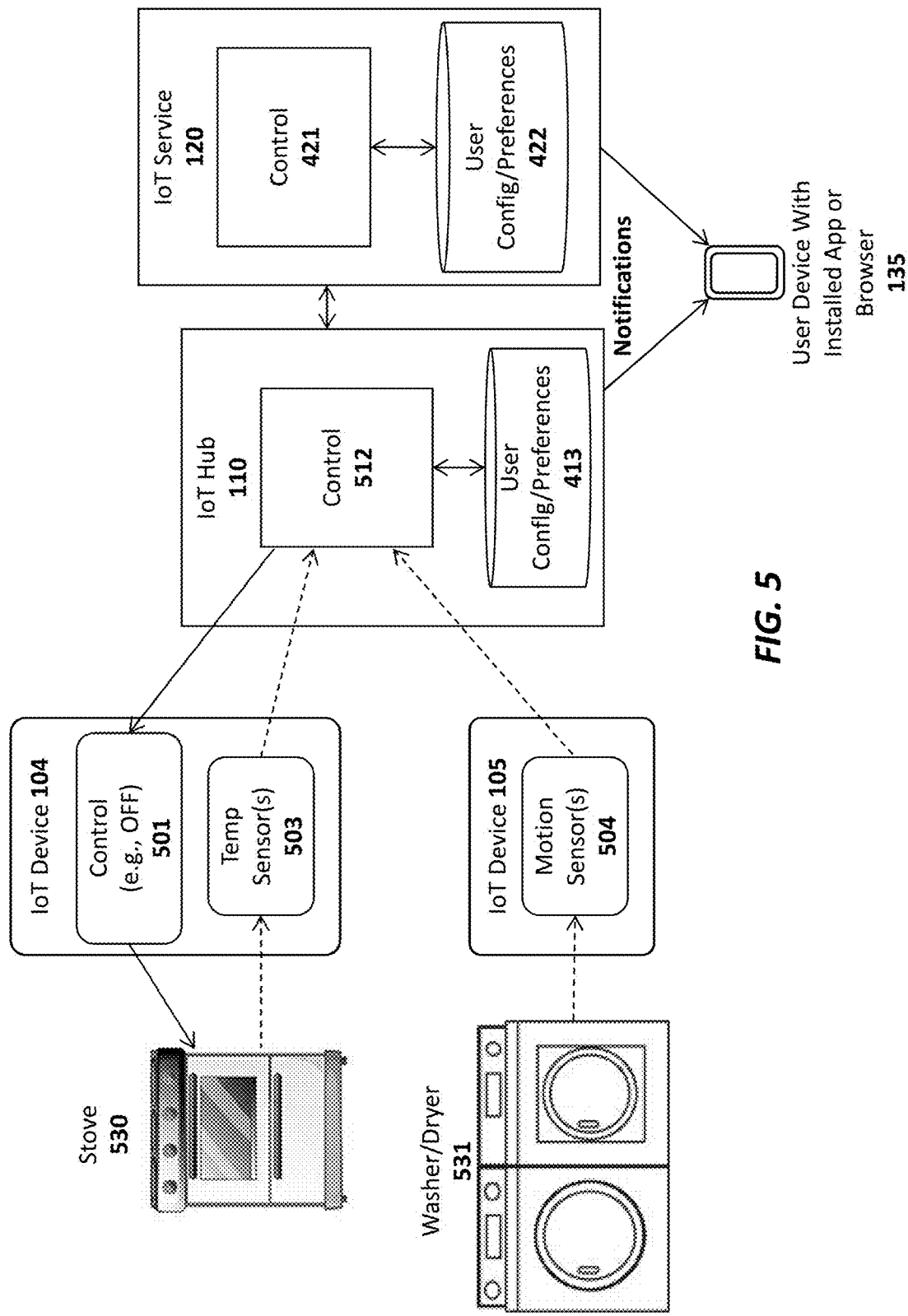
FIG. 5 illustrates embodiments of the invention for collecting data from IoT devices and generating notifications from an IoT hub and/or IoT service.

FIG. 5 illustrates additional embodiments of IoT devices 104-105 equipped with sensors 503-504 for monitoring electronic equipment 530-531. In particular, the IoT device 104 of this embodiment includes a temperature sensor 503 which may be placed on or near a stove 530 to detect when the stove has been left on. In one embodiment, the IoT device 104 transmits the current temperature measured by the temperature sensor 503 to the IoT hub 110 and/or the IoT service 120. If the stove is detected to be on for more than a threshold time period (e.g., based on the measured temperature), then control logic 512 may transmit a notification to the end user's device 135 informing the user that the stove 530 is on. In addition, in one embodiment, the IoT device 104 may include a control module 501 to turn off the stove, either in response to receiving an instruction from the user or automatically (if the control logic 512 is programmed to do so by the user). In one embodiment, the control logic 501 comprises a switch to cut off electricity or gas to the stove 530. However, in other embodiments, the control logic 501 may be integrated within the stove itself.

FIG. 5 also illustrates an IoT device 105 with a motion sensor 504 for detecting the motion of certain types of electronics equipment such as a washer and/or dryer. Another sensor that may be used is an audio sensor (e.g., microphone and logic) for detecting an ambient volume level. As with the other embodiments described above, this embodiment may transmit notifications to the end user if certain specified conditions are met (e.g., if motion is detected for an extended period of time, indicating that the washer/dryer are not turning off). Although not shown in FIG. 5, IoT device 105 may also be equipped with a control module to turn off the washer/dryer 531 (e.g., by switching off electric/gas), automatically, and/or in response to user input.

In one embodiment, a first IoT device with control logic and a switch may be configured to turn off all power in the user's home and a second IoT device with control logic and a switch may be configured to turn off all gas in the user's home. IoT devices with sensors may then be positioned on or near electronic or gas-powered equipment in the user's home. If the user is notified that a particular piece of equipment has been left on (e.g., the stove 530), the user may then send a command to turn off all electricity or gas in the home to prevent damage. Alternatively, the control logic 512 in the IoT hub 110 and/or the IoT service 120 may be configured to automatically turn off electricity or gas in such situations.

In one embodiment, the IoT hub 110 and IoT service 120 communicate at periodic intervals. If the IoT service 120 detects that the connection to the IoT hub 110 has been lost (e.g., by failing to receive a request or response from the IoT hub for a specified duration), it will communicate this information to the end user's device 135 (e.g., by sending a text message or app-specific notification).

Apparatus and Method for Accurately Sensing User Location in an IoT System

Current wireless "smart" locks and garage door openers allow an end user to control a lock and/or garage door via a mobile device. To operate these systems, the user must open an app on the mobile device and select an open/unlock or close/lock option. In response, a wireless signal is sent to a receiver on or coupled to the wireless lock or garage door which implements the desired operation. While the discussion below focuses on wireless "locks", the term "lock" is used broadly herein to refer to standard door locks, wireless garage door openers, and any other device for limiting access to a building or other location.

Figure 6:
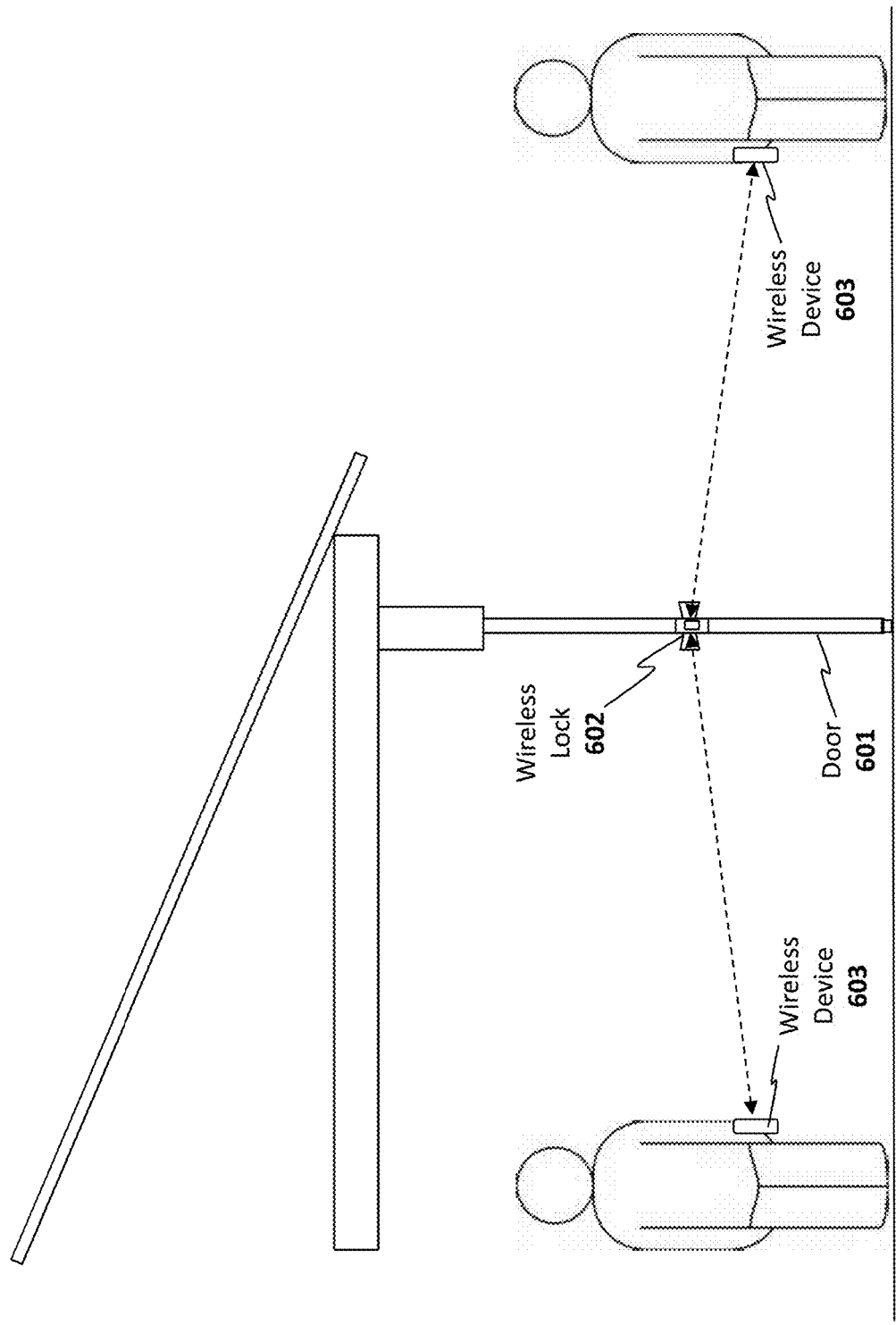
FIG. 6 illustrates problems with identifying a user in current wireless lock systems.

Some wireless locks attempt to determine when the user is outside the door and responsively trigger the open/unlock function. FIG. 6, for example, illustrates an example in which a wireless lock 602 is triggered in response to a user with a wireless device 603 approaching from the outside of the door 601, based on the signal strength of the signal from the wireless device 603. For example, the wireless lock 602 may measure the received signal strength indicator (RSSI) from the wireless device 603 and, when it reaches a threshold (e.g., −60 dbm), will unlock the door 601.

One obvious problem with these techniques is that the RSSI measurement is non-directional. For example, the user may move around the home with the wireless device 603 and pass by the wireless lock 602 or garage door opener, thereby causing it to trigger. For this reason, the use of wireless locks which operate based on user proximity detection has been limited.

Figure 7:
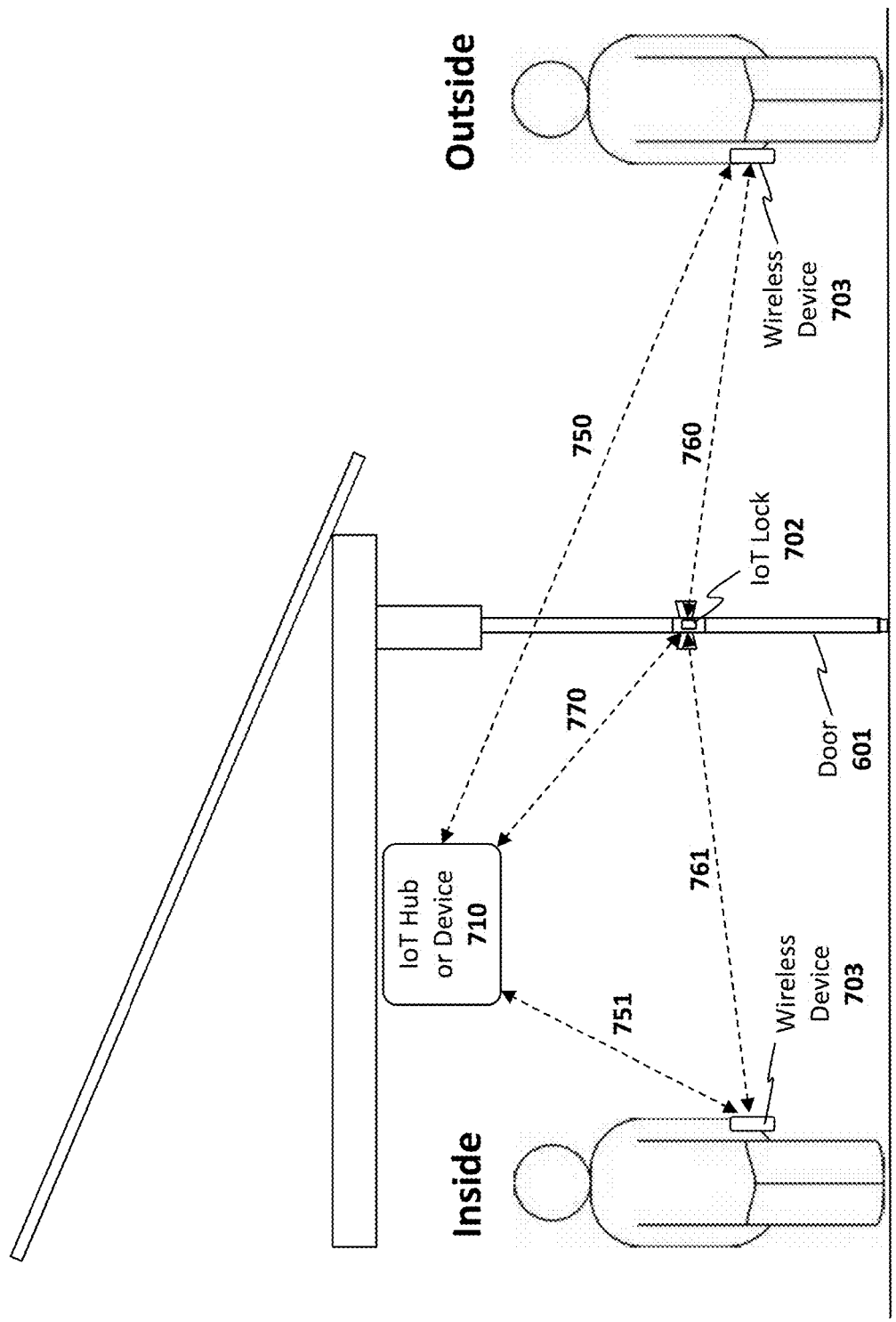
FIG. 7 illustrates a system in which IoT devices and/or IoT hubs are employed to accurately detect the location of a user of a wireless lock system.

FIG. 7 illustrates one embodiment of the invention which an IoT hub and/or IoT device 710 is used to determine the location of the user with greater accuracy. In particular, this embodiment of the invention measures signal strength between the wireless device 703 and the IoT lock device 702 and also measures signal strength between the wireless device 703 and one or more IoT devices/hubs 710 to differentiate between cases where the user is outside the home and inside the home. For example, if the user is a particular distance from the IoT lock 702 inside or outside the home, then the signal strength 761 from the position inside the home and signal strength 760 outside the home may be roughly the same. In prior systems, such as illustrated in FIG. 6, there was no way to differentiate between these two cases. However, in the embodiment shown in FIG. 7, the differences in signal strength measurements 750 and 751, measured between the IoT hub/device 710 and the wireless device 703 when the user is outside the home and inside the home, respectively, are used to determine the location of the user. For example, when the wireless device 703 is at the outside location, the signal strength 750 may be measurably different than the signal strength 751 when the wireless device 703 is at the inside location. While in most cases the signal strength 751 inside the home should be stronger, there may be instances where the signal strength 751 is actually weaker. The important point is that the signal strength may be used to differentiate the two positions.

The signal strength values 760-761, 750-751 may be evaluated at the IoT hub/device 710 or at the IoT lock 702 (if it has the intelligence to perform this evaluation). The remainder of this discussion will assume that the signal strength evaluation is performed by an IoT hub 710, which may then transmit a lock or unlock command (or no command if already locked/unlocked) to the IoT lock 702 over a wireless communication channel 770 (e.g., BTLE) based on the results of the evaluation. It should be noted, however that the same basic evaluation and result may be performed directly by the IoT lock 702 if it is configured with the logic to perform the evaluation (e.g., where the signal strength values are provided to the IoT lock 702).

Figure 8:
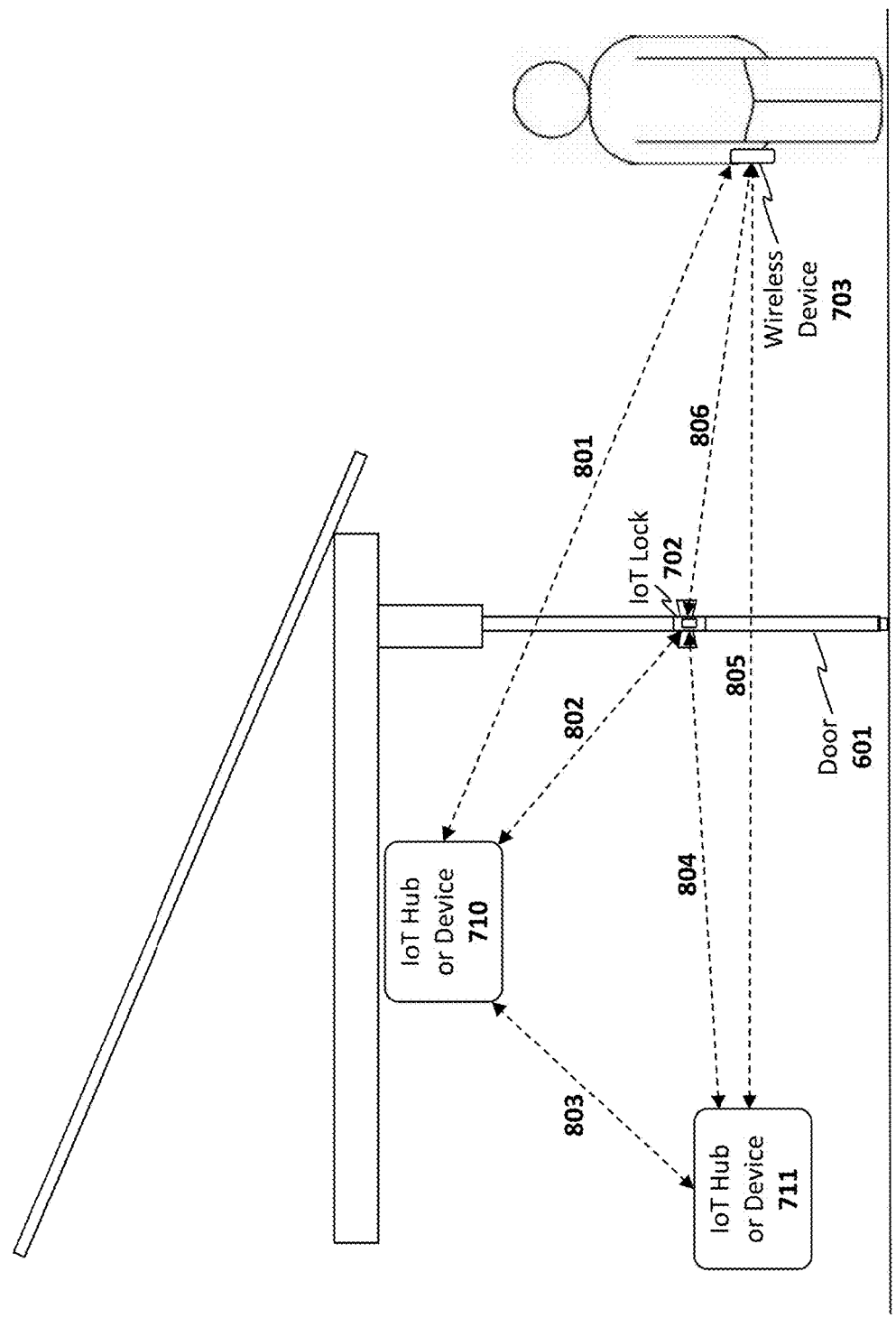
FIG. 8 illustrates another embodiment in which IoT devices and/or IoT hubs are employed to accurately detect the location of a user of a wireless lock system.

FIG. 8 illustrates another embodiment which is capable of providing greater accuracy, because it utilizes the signal strength values from two IoT hubs/devices 710-711. In this embodiment, the signal strength 805 is measured between the wireless device 703 and (1) IoT hub/device 711; (2) IoT hub/device 710; and (3) IoT lock 702. The wireless device is shown in a single position in FIG. 8 for simplicity.

In one embodiment, all of the collected signal strength values are provided to one of the IoT hub devices 710-711, which then evaluate the values to determine the location of the user (e.g., inside or outside). If it is determined that the user is outside, then the IoT hub/device 710 may send a command to the IoT lock 702 to unlock the door. Alternatively, if the IoT lock 702 has the logic to perform the evaluation, the IoT hubs/devices 710-711 may transmit the signal strength values to the IoT lock 702 which evaluates the signal strength values to determine the location of the user.

Figure 9:
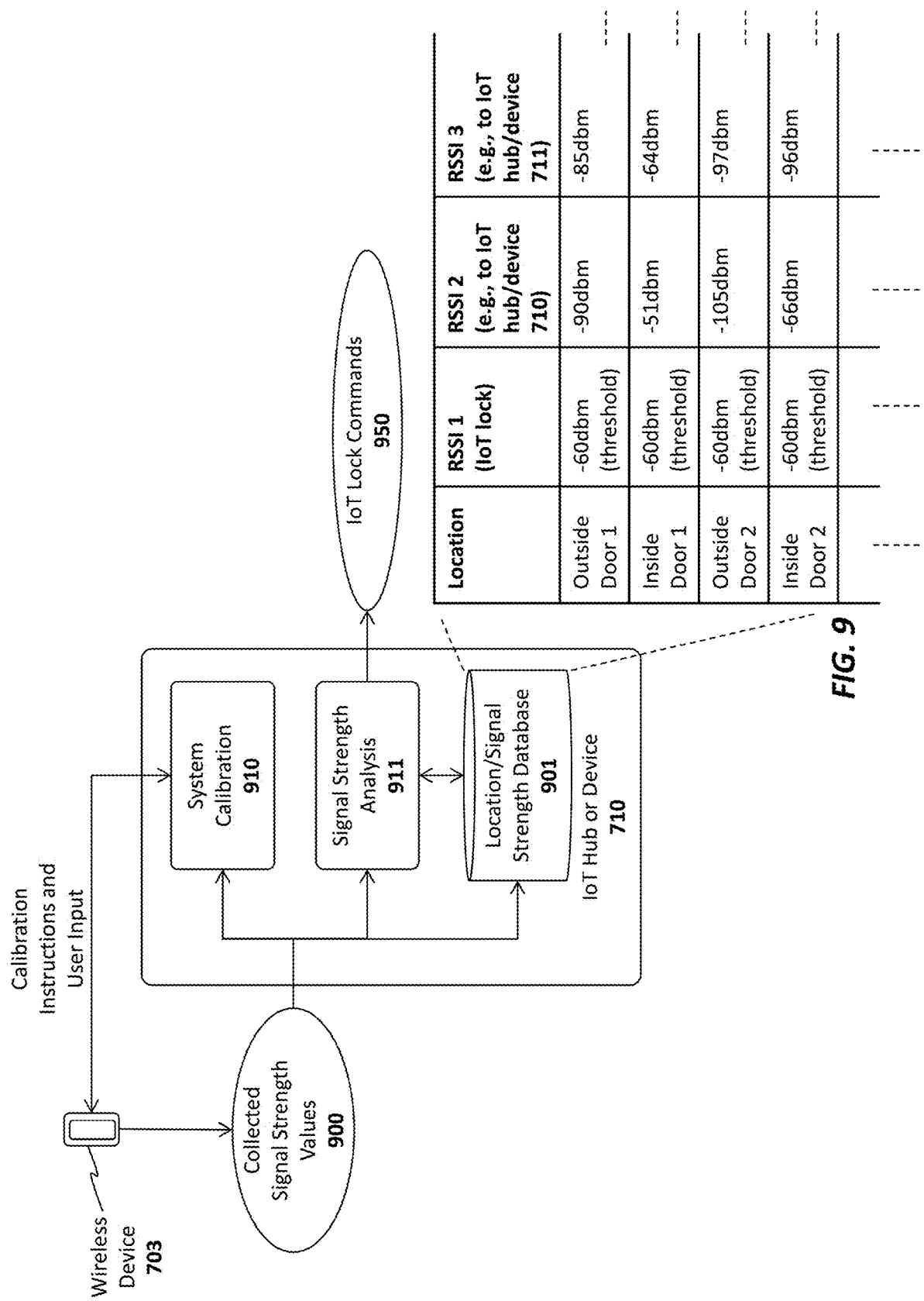
FIG. 9 illustrates one embodiment for calibrating a location detection system and detecting a location of a user based on signal strength values.

As illustrated in FIG. 9, in one embodiment, a calibration module 910 on the IoT hub 710 communicates with an app or browser-based code on the wireless device 703 to calibrate the signal strength measurements. During calibration, the system calibration module 910 and/or calibration app may instruct the user to stand in certain locations outside the door and inside the door (e.g., outside 6 ft outside door 1, 6 ft inside door 1, 6 ft outside door 2, etc). The user may indicate that he/she is in the desired position by selecting a graphic on the user interface. The system calibration app and/or system calibration module 910 will then associate the collected signal strength values 900 with each location within a location database 901 on the IoT hub/device 710.

Once the signal strength values for different known locations of the user are collected and stored in the database 901, a signal strength analysis module 911 uses these values to determine whether to send IoT lock commands 950 to lock/unlock the door based on the detected signal strength values. In the embodiment shown in FIG. 9, four exemplary locations are shown for two different doors: outside door 1, inside door 1, outside door 2, and inside door 2. The RSSI1 value is associated with the wireless lock and is set to a threshold value of −60 dbm. Thus, in one embodiment, the signal strength analysis module 911 will not perform its evaluation to determine the location of the user unless the RSSI1 value is at least −60 dmb. The RSSI2 and RSSI3 values are signal strength values measured between the user's wireless device and two different IoT hubs/devices.

Assuming that the RSSI1 threshold is reached, the signal strength analysis module 911 compares the current signal strength values 900 measured between the IoT hubs/devices and the user's wireless device with the RSSI2/RSSI3 values from the location database 901. If the current RSSI values are within a specified range of the values specified in the database for RSSI2 (e.g., for IoT hub/device 710) and RSSI3 (e.g. for IoT hub/device 711), then the wireless device is determined to be at or near the associated location. For example, because the RSSI2 value associated with the "outside door 1" location is −90 dbm (e.g., based on the measurement made during calibration), if the currently measured signal strength for RSSI2 is between −93 dbm and −87 dbm then the RSSI2 comparison may be verified (assuming a specified range of ±3 dbm). Similarly, because the RSSI3 value associated with the "outside door 1" location is −85 dbm (e.g., based on the measurement made during calibration), if the currently measured signal strength for RSSI3 is between −88 dbm and −82 dbm then the RSSI3 comparison may be verified. Thus, if the user is within the −60 dbm value for the IoT lock and within the above-specified ranges for RSSI2 and RSSI3, the signal strength analysis module 911 will send a command 950 to open the lock. By comparing the different RSSI values in this manner, the system avoids undesirable "unlock" events when the user passes within −60 dbm of the IoT lock from inside the home, because the RSSI measurements for RSSI2 and RSSI3 are used to differentiate the inside and outside cases.

In one embodiment, the signal strength analysis module 911 relies on on RSSI values which provide the greatest amount of differentiation between the inside and outside cases. For example, there may be some instances where the RSSI values for the inside and outside cases are equivalent or very close (e.g., such as the RSSI3 values of −96 dbm and −97 dbm for inside door 2 and outside door 2, respectively). In such a case, the signal strength analysis module will use the other RSSI value to differentiate the two cases. In addition, in one embodiment, the signal strength analysis module 911 may dynamically adjust the RSSI ranges used for the comparison when the recorded RSSI values are close (e.g., making the ranges smaller when the measured RSSI values are closer). Thus, while ±3 dbm is used as a comparison range for the example above, various different ranges may be set for the comparison based on the how close the RSSI measurements are.

In one embodiment, the system calibration module 910 system continues to train the system by measuring dbm values each time the user enters through a door. For example, in response to the user successfully entering the home following the initial calibration, the system calibration module 910 may store additional RSSI values for RSSI2 and RSSI3. In this manner, a range of RSSI values may be stored for each case in the location/signal strength database 901 to further differentiate between the inside and outside cases. The end result is a far more accurate wireless lock system than currently available.

Figure 10:
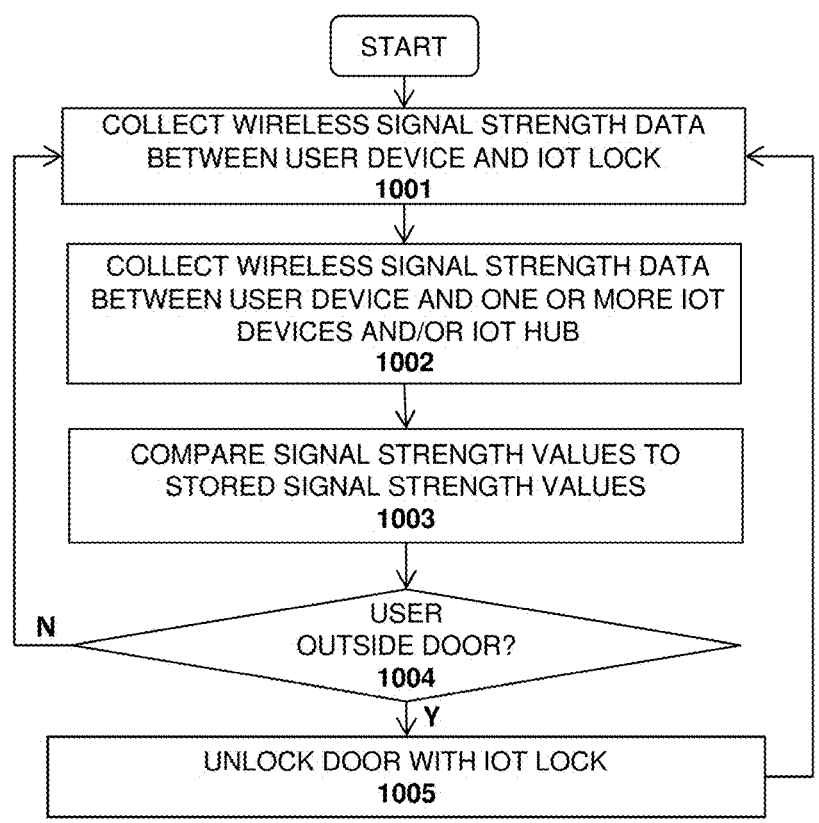
FIG. 10 illustrates a method for implementing a wireless lock system using IoT devices and/or IoT hubs.

A method in accordance with one embodiment of the invention is illustrated in FIG. 10. The method may be implemented within the context of the system architectures described above, but is not limited to any specific system architecture.

At 1001, the wireless signals strength between a user device and an IoT lock is measured. At 1002, if the signal strength is above a specified threshold (i.e., indicating that the user is near the door), then at 1002, the wireless signal strength between the user device and one or more IoT hubs/devices is measured. At 1003, the collected wireless signal strength values are compared with previously collected and stored signal strength values to determine the location of the user. For example, if the RSSI values are within a specified range of RSSI values when the user was previously outside of the door, then it may be determined that the user is presently outside of the door. At 1004, based on the evaluation, a determination is made as to whether the user is outside of the door. If so, then at 1005, the door is automatically unlocked using the IoT lock.

Figure 11:
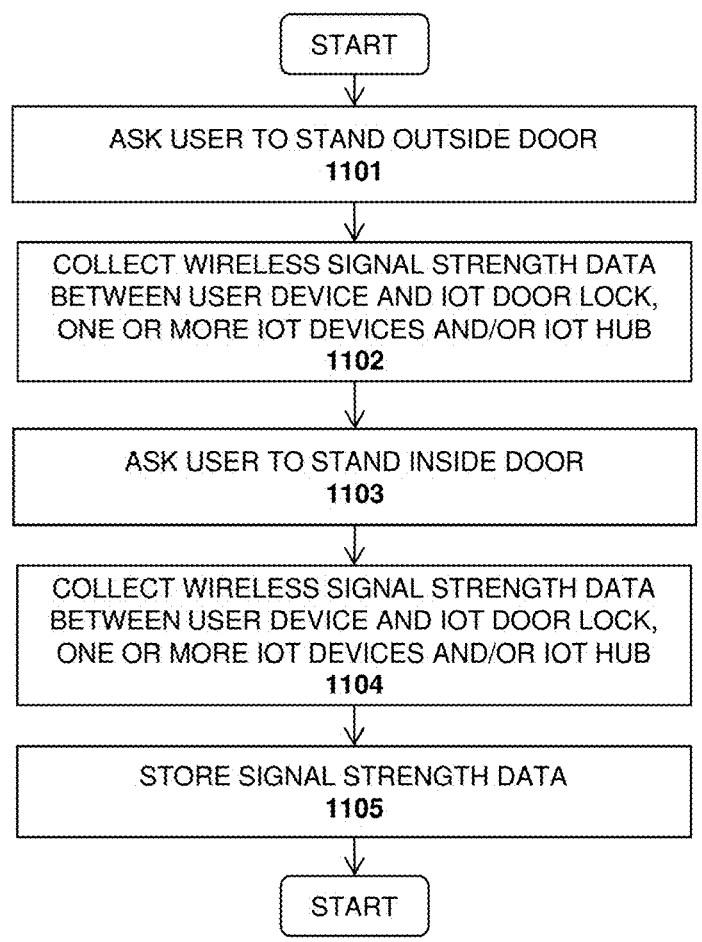
FIG. 11 illustrates one embodiment of a method for calibrating a wireless lock system.

A method for calibrating the IoT lock system is illustrated in FIG. 11. At 1101, the user is asked to stand outside of the door and at 1102, the wireless signal strength data is collected between the user device and one or more IoT devices/hubs. As mentioned, the request may be sent to the user via a user app installed on the user's wireless device. At 1103, the user is asked to stand inside of the door and at 1104, the wireless signal strength data is collected between the user device and the IoT devices/hubs. At 1105, the signal strength data is stored in a database so that it may be used to compare signal strength values as described herein to determine the user's current location.

Note that while a user's home is used herein as an exemplary embodiment, the embodiments of the invention are not limited to a consumer application. For example, these same techniques may be employed to provide access to businesses or other types of buildings.

In one embodiment, similar techniques as described above are used to track the user throughout the user's home. For example, by tracking the RSSI measurements between the user's wireless device and various IoT devices/hubs in the user's home, a "map" of different user locations may be compiled. This map may then be used to provide services to the end user, such as directing audio to speakers in the room in which the user is presently located.

Figure 12:
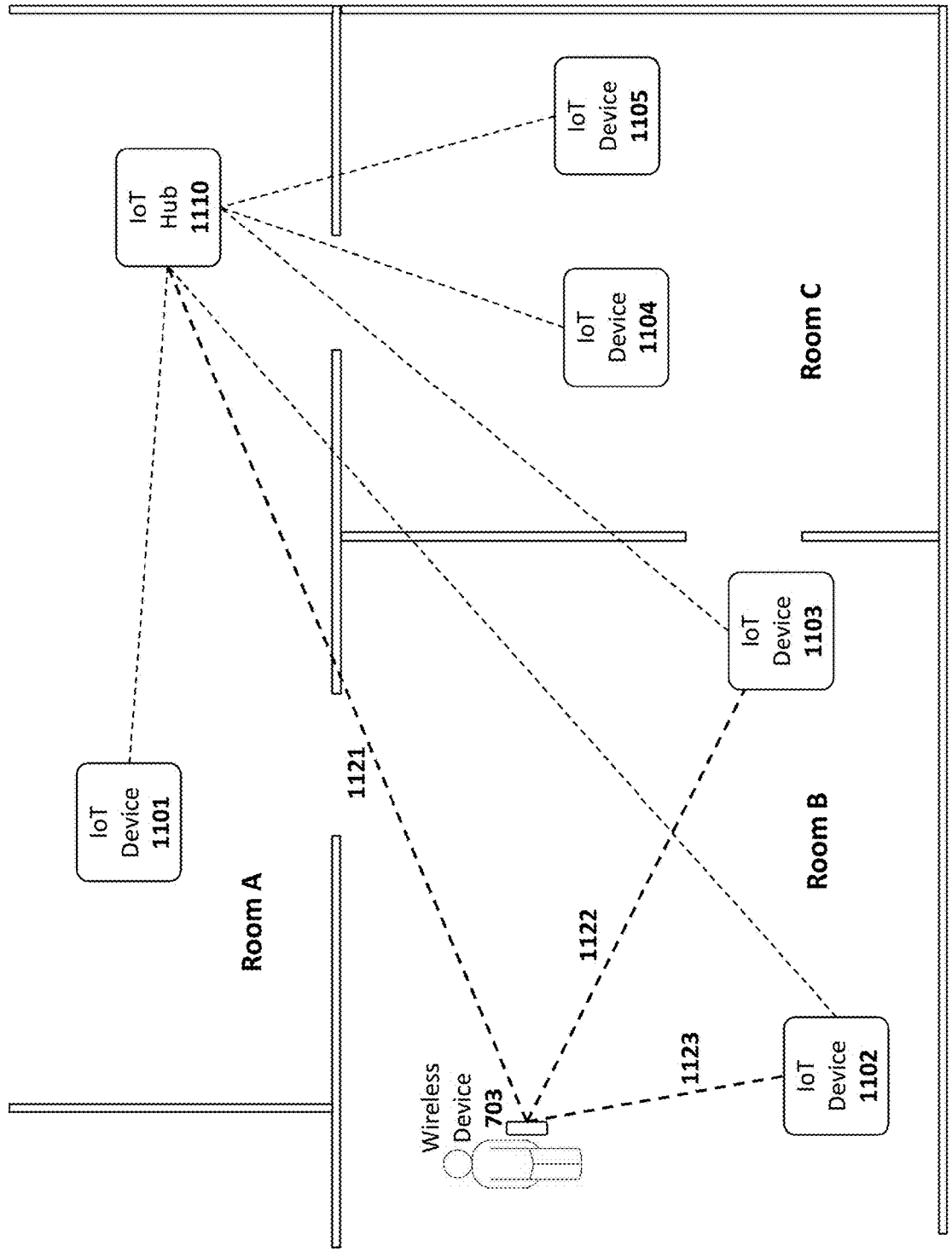
FIG. 12 illustrates one embodiment of the invention for determining the location of a user with signal strength values.

FIG. 12 provides an overview of an exemplary system in which RSSI values measured between the wireless device 703 and a plurality of IoT devices 1101-1105 and IoT hub 1110 are used to determine whether the user is in Rooms A, B, or C. In particular, based on the RSSI values 1121-1123 measured between the wireless device 703 and the IoT hub 1110, IoT device 1103, and IoT device 1102, the IoT hub 1110 may determine that the user is presently in Room B, as illustrated. Similarly, when the user moves into Room C, RSSI measurements between the wireless device 703 and IoT devices 1104-1105 and IoT hub 1110 may then be used to determine that the user is in Room C. While only 3 RSSI measurements 1121-1123 are shown in FIG. 12, RSSI measurements may be made between any IoT device or IoT hub within range of the wireless device 703 to provide greater accuracy.

In one embodiment, the IoT hub 1110 may employ triangulation techniques based on RSSI values between itself and the various IoT devices 1101-1105 and the wireless device 703 to triangulate the location of the user. For example, the RSSI triangle formed between IoT device 1102, the IoT hub 1110 and the wireless device 703 may be used to determine the present location of the wireless device 703, based on the RSSI values for each edge of the triangle.

Figure 13:
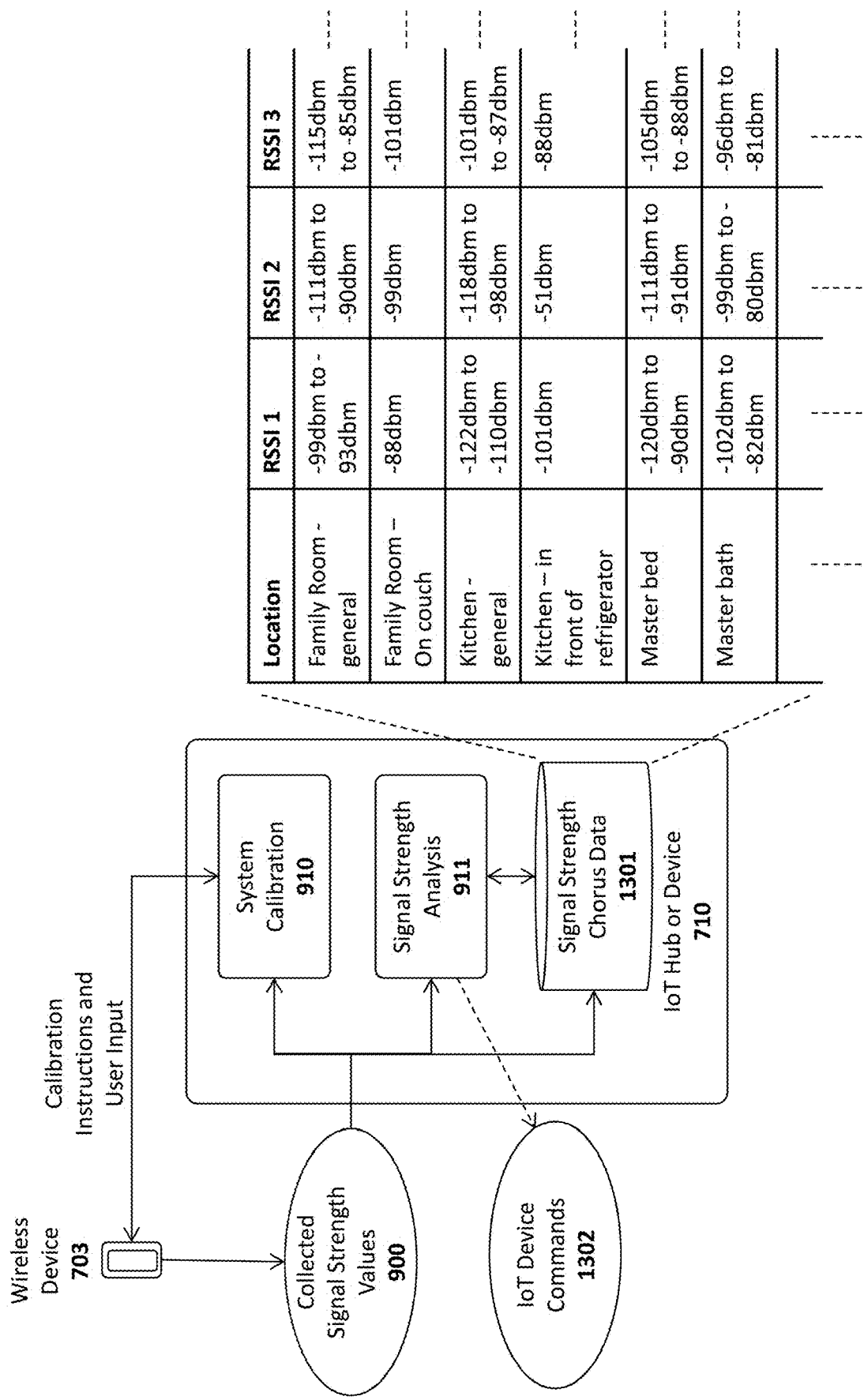
FIG. 13 illustrates another embodiment for calibrating a location detection system and detecting a location of a user based on signal strength values.

In one embodiment, similar calibration techniques to those described above may be used to collect signal strength values in each room. FIG. 13 illustrates the system calibration module 910 which, as in the embodiments described above, communicates with an app or browser-based code on the wireless device 703 to calibrate the signal strength measurements. During calibration, the system calibration module 910 and/or calibration app may instruct the user to stand in different rooms and in certain locations within each room, depending on the applications for which the IoT system is being used. As described above, the user may indicate that he/she is in the desired position by selecting a graphic on the user interface. The system calibration app and/or system calibration module 910 will then associate the collected signal strength values 900 with each location within a location database 1301 on the IoT hub/device 710.

Once the signal strength values for different known locations of the user are collected and stored in the database 1301, a signal strength analysis module 911 uses these values to control the various IoT devices 1101-1105 around the user's home. For example, if the IoT devices 1101-1105 comprise speakers or amplifiers for a home audio system, the signal strength analysis module 911 may transmit IoT device commands 1302 to control the rooms in which the audio is being played back (e.g., turning on speakers in the room in which the user is present and turning off speakers in other rooms). Similarly, if the IoT devices 1101-1105 comprise lighting control units, then the signal strength analysis module 911 may transmit IoT device commands 1302 to turn on lights in the room in which the user is present and turn off lights in the other rooms. Of course, the underlying principles of the invention are not limited to any specific end-user applications.

As mentioned, one embodiment of the system calibration module 910 will collect RSSI data for different points within a room based on the application. In FIG. 13, RSSI ranges are collected for each room by instructing the user to stand in different positions within the room. For example, for the user's Family Room, RSSI ranges of −99 dbm to −93 dbm, −111 dbm to −90 dbm and −115 dbm to −85 dbm are collected for RSSI1, RSSI2, and RSSI3, respectively (i.e., collected from three different IoT devices/hubs). When the current position of the wireless device 703 falls within each of these ranges, the signal strength analysis module 911 will determine that the user is in the Family Room and potentially send IoT device commands 1302 to perform a specified set of functions (e.g., turn on lights, audio, etc). In addition, for specific points within the room, specific RSSI values may be collected. For example, in FIG. 13, values of −88 dbm, −99 dbm, and −101 dbm have been collected when the user is sitting on the sofa in the family room. As in the embodiments described above, the signal strength analysis module 911 may determine that the user is on the couch if the RSSI values are within a specified range of the stored RSSI values (e.g., within while ±3 dbm). In addition, as in prior embodiments, the system calibration module 910 may continue to collect data for the different locations to ensure that the RSSI values remain current. For example, if the user rearranges the Family Room, the position of the couch may move. In this case, the system calibration module 910 may ask the user if the user is currently sitting the couch (e.g., given the similarity of the RSSI values from those stored in the database), and update the signal strength database 1301 with the new values.

In one embodiment, the user's interaction with various types of IoT devices may be used to determine the location of the user. For example, if the user's refrigerator is equipped with an IoT device, then the system may take RSSI measurements upon detecting that the user has opened the refrigerator door. Similarly, if the lighting system comprises an IoT system, when the user adjusts the lights in different rooms of the home or business, the system may automatically take RSSI measurements. By way of another example, when the user interacts with various appliances (e.g., washers, dryers, dishwasher), audiovisual equipment (e.g., televisions, audio equipment, etc), or HVAC systems (e.g., adjusting the thermostat), the system may capture RSSI measurements and associate the measurements with these locations.

While a single user is described in the embodiments set forth above, the embodiments of the invention may be implemented for multiple users. For example, the system calibration module 910 may collect signal strength values for both User A and User B to be stored in the signal strength database 1301. The signal strength analysis module 911 may then identify the current location of Users A and B based on comparisons of signal strength measurements and send IoT commands 1302 to control IoT devices around the home of Users A and B (e.g., keeping on lights/speakers in the rooms in which Users A and B are present).

The wireless device 703 employed in the embodiments of the invention described herein may be a smartphone, tablet, wearable device (e.g., a smartwatch, token on a neckless or bracelet), or any other form of wireless device 703 capable of detecting RSSI values. In one embodiment, the wireless device 703 communicates with the IoT devices 1101-1105 and IoT hub 1110 via a short range, low power wireless communication protocol such as Bluetooth LE (BTLE). In addition, in one embodiment, the wireless device 703 communicates with the IoT hub 1110 via a longer range wireless protocol such as Wifi. Thus, in this embodiment, the RSSI values may be gathered by the wireless device 703 and communicated back to the IoT hub 1110 using the longer range protocol. In addition, each of the individual IoT devices 1101-1105 may collect the RSSI values and communicate these values back to the IoT hub 1110 via the short range wireless protocol. The underlying principles of the invention are not limited to any specific protocol or technique used to collect the RSSI values.

One embodiment of the invention uses the techniques described herein to locate an ideal position for a wireless extender to extend the range of the IoT hub 1110 using the short range wireless protocol. For example, in one embodiment, upon purchasing a new extender the system calibration module 910 will send instructions for the user to move into each of the rooms of the user's home with the wireless extender device (e.g., by sending instructions to the app on the wireless device 703). A connection wizard may also be executed on the wireless device 703 to step the user through the process. Following the instructions sent by the system calibration module 910 or from the wizard, the user will walk into each room and press a button on the wireless device 703. The IoT hub 1110 will then measure signal strength between itself and the extender and also the signal strength between the extender and all of the other IoT devices in the system. The system calibration module 910 or wireless device wizard may then provide the user will a prioritized list of the best locations to place the wireless extender (i.e., selecting those locations with the highest signal strength between the wireless extender and the IoT hub 1110 and/or between the wireless extender and the IoT devices 1101-1105).

The embodiments of the invention described above provide for fine-tuned location awareness within an IoT system not found in current IoT systems. In addition, to improve location accuracy, in one embodiment the GPS system on the wireless device 703 may communicate precise GPS data to be used to provide an accurate map of the user's home which will include GPS data as well as RSSI data for each location.

Embodiments for Improved Security

In one embodiment, the low power microcontroller 200 of each IoT device 101 and the low power logic/microcontroller 301 of the IoT hub 110 include a secure key store for storing encryption keys used by the embodiments described below (see, e.g., FIGS. 14-19 and associated text). Alternatively, the keys may be secured in a subscriber identity module (SIM) as discussed below.

Figure 14:
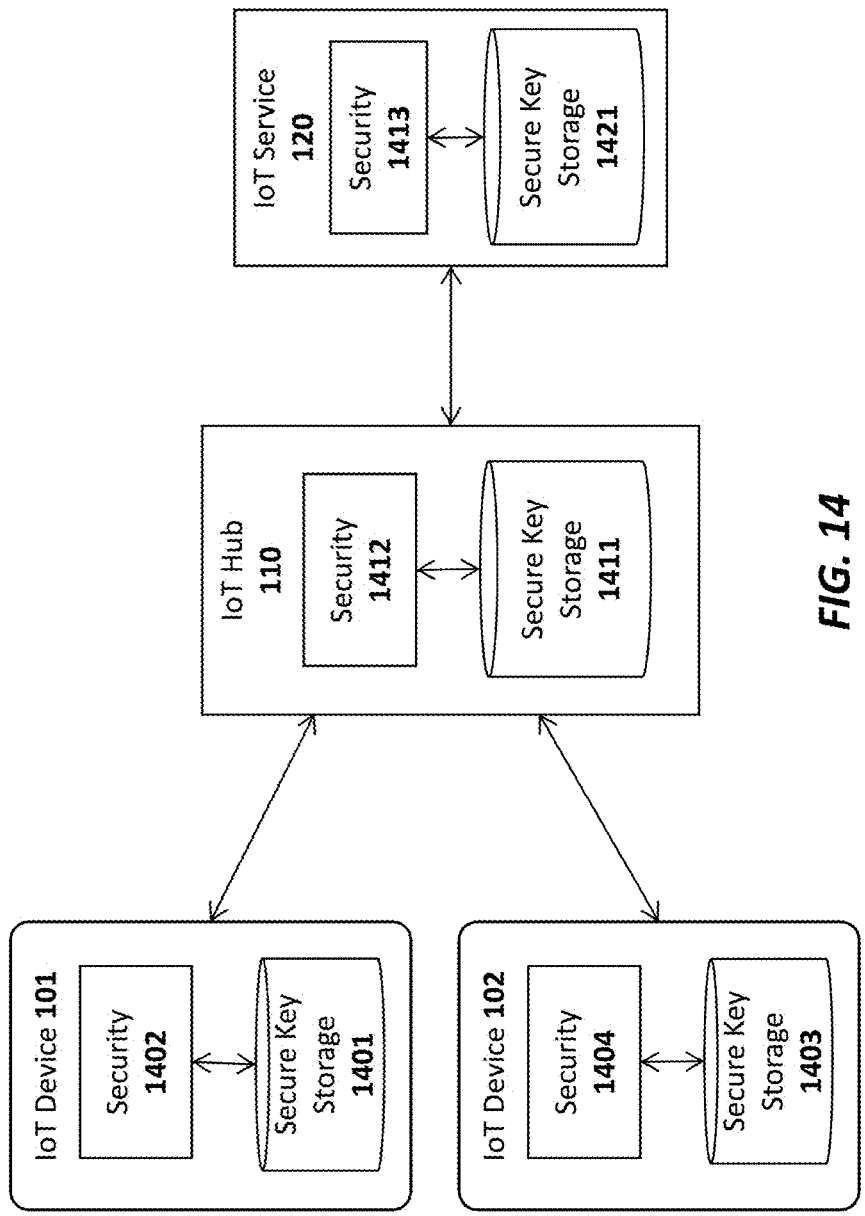
FIG. 14 illustrates embodiments of the invention which implements improved security techniques such as encryption and digital signatures.

FIG. 14 illustrates a high level architecture which uses public key infrastructure (PKI) techniques and/or symmetric key exchange/encryption techniques to encrypt communications between the IoT Service 120, the IoT hub 110 and the IoT devices 101-102.

Embodiments which use public/private key pairs will first be described, followed by embodiments which use symmetric key exchange/encryption techniques. In particular, in an embodiment which uses PKI, a unique public/private key pair is associated with each IoT device 101-102, each IoT hub 110 and the IoT service 120. In one embodiment, when a new IoT hub 110 is set up, its public key is provided to the IoT service 120 and when a new IoT device 101 is set up, it's public key is provided to both the IoT hub 110 and the IoT service 120. Various techniques for securely exchanging the public keys between devices are described below. In one embodiment, all public keys are signed by a master key known to all of the receiving devices (i.e., a form of certificate) so that any receiving device can verify the validity of the public keys by validating the signatures. Thus, these certificates would be exchanged rather than merely exchanging the raw public keys.

As illustrated, in one embodiment, each IoT device 101, 102 includes a secure key storage 1401, 1403, respectively, for security storing each device's private key. Security logic 1402, 1304 then utilizes the securely stored private keys to perform the encryption/decryption operations described herein. Similarly, the IoT hub 110 includes a secure storage 1411 for storing the IoT hub private key and the public keys of the IoT devices 101-102 and the IoT service 120; as well as security logic 1412 for using the keys to perform encryption/decryption operations. Finally, the IoT service 120 may include a secure storage 1421 for security storing its own private key, the public keys of various IoT devices and IoT hubs, and a security logic 1413 for using the keys to encrypt/decrypt communication with IoT hubs and devices. In one embodiment, when the IoT hub 110 receives a public key certificate from an IoT device it can verify it (e.g., by validating the signature using the master key as described above), and then extract the public key from within it and store that public key in it's secure key store 1411.

By way of example, in one embodiment, when the IoT service 120 needs to transmit a command or data to an IoT device 101 (e.g., a command to unlock a door, a request to read a sensor, data to be processed/displayed by the IoT device, etc) the security logic 1413 encrypts the data/command using the public key of the IoT device 101 to generate an encrypted IoT device packet. In one embodiment, it then encrypts the IoT device packet using the public key of the IoT hub 110 to generate an IoT hub packet and transmits the IoT hub packet to the IoT hub 110. In one embodiment, the service 120 signs the encrypted message with it's private key or the master key mentioned above so that the device 101 can verify it is receiving an unaltered message from a trusted source. The device 101 may then validate the signature using the public key corresponding to the private key and/or the master key. As mentioned above, symmetric key exchange/encryption techniques may be used instead of public/private key encryption. In these embodiments, rather than privately storing one key and providing a corresponding public key to other devices, the devices may each be provided with a copy of the same symmetric key to be used for encryption and to validate signatures. One example of a symmetric key algorithm is the Advanced Encryption Standard (AES), although the underlying principles of the invention are not limited to any type of specific symmetric keys.

Using a symmetric key implementation, each device 101 enters into a secure key exchange protocol to exchange a symmetric key with the IoT hub 110. A secure key provisioning protocol such as the Dynamic Symmetric Key Provisioning Protocol (DSKPP) may be used to exchange the keys over a secure communication channel (see, e.g., Request for Comments (RFC) 6063). However, the underlying principles of the invention are not limited to any particular key provisioning protocol.

Once the symmetric keys have been exchanged, they may be used by each device 101 and the IoT hub 110 to encrypt communications. Similarly, the IoT hub 110 and IoT service 120 may perform a secure symmetric key exchange and then use the exchanged symmetric keys to encrypt communications. In one embodiment a new symmetric key is exchanged periodically between the devices 101 and the hub 110 and between the hub 110 and the IoT service 120. In one embodiment, a new symmetric key is exchanged with each new communication session between the devices 101, the hub 110, and the service 120 (e.g., a new key is generated and securely exchanged for each communication session). In one embodiment, if the security module 1412 in the IoT hub is trusted, the service 120 could negotiate a session key with the hub security module 1312 and then the security module 1412 would negotiate a session key with each device 120. Messages from the service 120 would then be decrypted and verified in the hub security module 1412 before being re-encrypted for transmission to the device 101.

In one embodiment, to prevent a compromise on the hub security module 1412 a one-time (permanent) installation key may be negotiated between the device 101 and service 120 at installation time. When sending a message to a device 101 the service 120 could first encrypt/MAC with this device installation key, then encrypt/MAC that with the hub's session key. The hub 110 would then verify and extract the encrypted device blob and send that to the device.

In one embodiment of the invention, a counter mechanism is implemented to prevent replay attacks. For example, each successive communication from the device 101 to the hub 110 (or vice versa) may be assigned a continually increasing counter value. Both the hub 110 and device 101 will track this value and verify that the value is correct in each successive communication between the devices. The same techniques may be implemented between the hub 110 and the service 120. Using a counter in this manner would make it more difficult to spoof the communication between each of the devices (because the counter value would be incorrect). However, even without this a shared installation key between the service and device would prevent network (hub) wide attacks to all devices.

In one embodiment, when using public/private key encryption, the IoT hub 110 uses its private key to decrypt the IoT hub packet and generate the encrypted IoT device packet, which it transmits to the associated IoT device 101. The IoT device 101 then uses its private key to decrypt the IoT device packet to generate the command/data originated from the IoT service 120. It may then process the data and/or execute the command. Using symmetric encryption, each device would encrypt and decrypt with the shared symmetric key. If either case, each transmitting device may also sign the message with it's private key so that the receiving device can verify it's authenticity.

A different set of keys may be used to encrypt communication from the IoT device 101 to the IoT hub 110 and to the IoT service 120. For example, using a public/private key arrangement, in one embodiment, the security logic 1402 on the IoT device 101 uses the public key of the IoT hub 110 to encrypt data packets sent to the IoT hub 110. The security logic 1412 on the IoT hub 110 may then decrypt the data packets using the IoT hub's private key. Similarly, the security logic 1402 on the IoT device 101 and/or the security logic 1412 on the IoT hub 110 may encrypt data packets sent to the IoT service 120 using the public key of the IoT service 120 (which may then be decrypted by the security logic 1413 on the IoT service 120 using the service's private key). Using symmetric keys, the device 101 and hub 110 may share a symmetric key while the hub and service 120 may share a different symmetric key.

While certain specific details are set forth above in the description above, it should be noted that the underlying principles of the invention may be implemented using various different encryption techniques. For example, while some embodiments discussed above use asymmetric public/private key pairs, an alternate embodiment may use symmetric keys securely exchanged between the various IoT devices 101-102, IoT hubs 110, and the IoT service 120. Moreover, in some embodiments, the data/command itself is not encrypted, but a key is used to generate a signature over the data/command (or other data structure). The recipient may then use its key to validate the signature.

Figure 15:
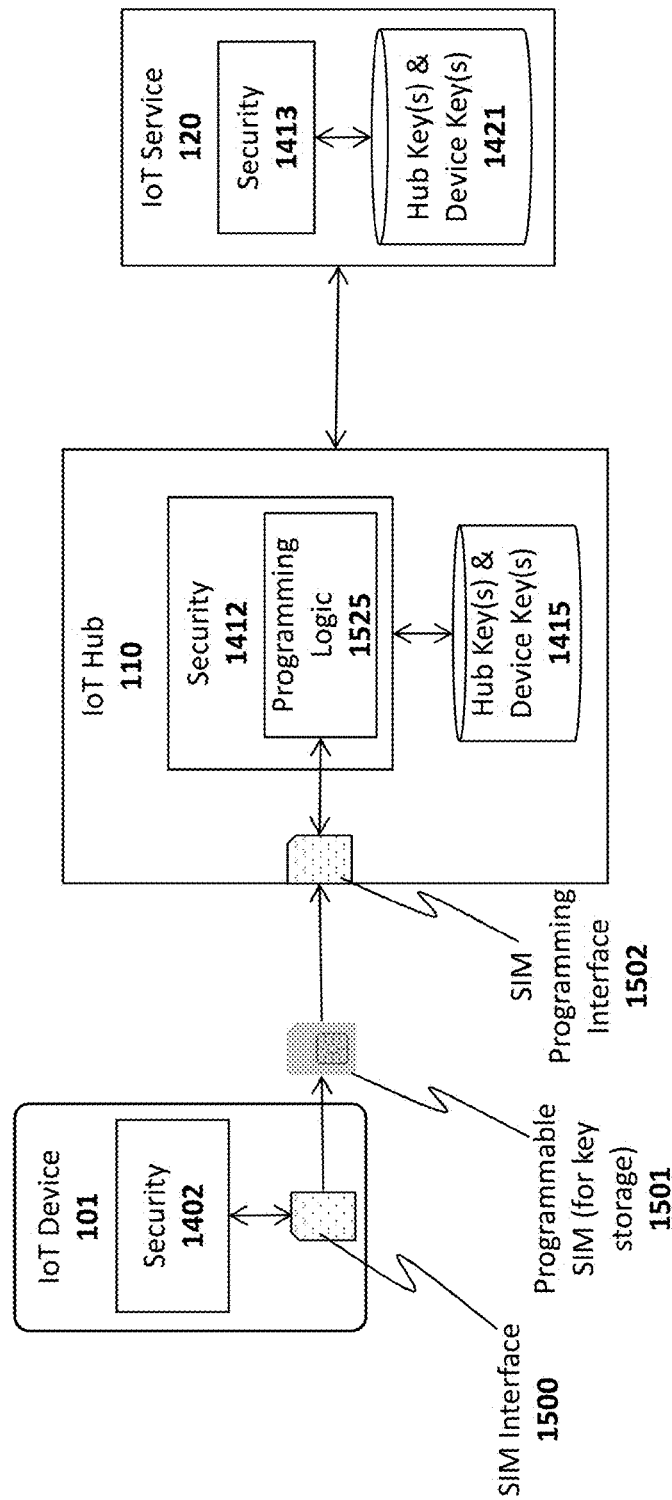
FIG. 15 illustrates one embodiment of an architecture in which a subscriber identity module (SIM) is used to store keys on IoT devices.

As illustrated in FIG. 15, in one embodiment, the secure key storage on each IoT device 101 is implemented using a programmable subscriber identity module (SIM) 1501. In this embodiment, the IoT device 101 may initially be provided to the end user with an un-programmed SIM card 1501 seated within a SIM interface 1500 on the IoT device 101. In order to program the SIM with a set of one or more encryption keys, the user takes the programmable SIM card 1501 out of the SIM interface 500 and inserts it into a SIM programming interface 1502 on the IoT hub 110. Programming logic 1525 on the IoT hub then securely programs the SIM card 1501 to register/pair the IoT device 101 with the IoT hub 110 and IoT service 120. In one embodiment, a public/private key pair may be randomly generated by the programming logic 1525 and the public key of the pair may then be stored in the IoT hub's secure storage device 411 while the private key may be stored within the programmable SIM 1501. In addition, the programming logic 525 may store the public keys of the IoT hub 110, the IoT service 120, and/or any other IoT devices 101 on the SIM card 1401 (to be used by the security logic 1302 on the IoT device 101 to encrypt outgoing data). Once the SIM 1501 is programmed, the new IoT device 101 may be provisioned with the IoT Service 120 using the SIM as a secure identifier (e.g., using existing techniques for registering a device using a SIM). Following provisioning, both the IoT hub 110 and the IoT service 120 will securely store a copy of the IoT device's public key to be used when encrypting communication with the IoT device 101.

The techniques described above with respect to FIG. 15 provide enormous flexibility when providing new IoT devices to end users. Rather than requiring a user to directly register each SIM with a particular service provider upon sale/purchase (as is currently done), the SIM may be programmed directly by the end user via the IoT hub 110 and the results of the programming may be securely communicated to the IoT service 120. Consequently, new IoT devices 101 may be sold to end users from online or local retailers and later securely provisioned with the IoT service 120.

While the registration and encryption techniques are described above within the specific context of a SIM (Subscriber Identity Module), the underlying principles of the invention are not limited to a "SIM" device. Rather, the underlying principles of the invention may be implemented using any type of device having secure storage for storing a set of encryption keys. Moreover, while the embodiments above include a removable SIM device, in one embodiment, the SIM device is not removable but the IoT device itself may be inserted within the programming interface 1502 of the IoT hub 110.

In one embodiment, rather than requiring the user to program the SIM (or other device), the SIM is pre-programmed into the IoT device 101, prior to distribution to the end user. In this embodiment, when the user sets up the IoT device 101, various techniques described herein may be used to securely exchange encryption keys between the IoT hub 110/IoTservice 120 and the new IoT device 101.

Figure 16A:
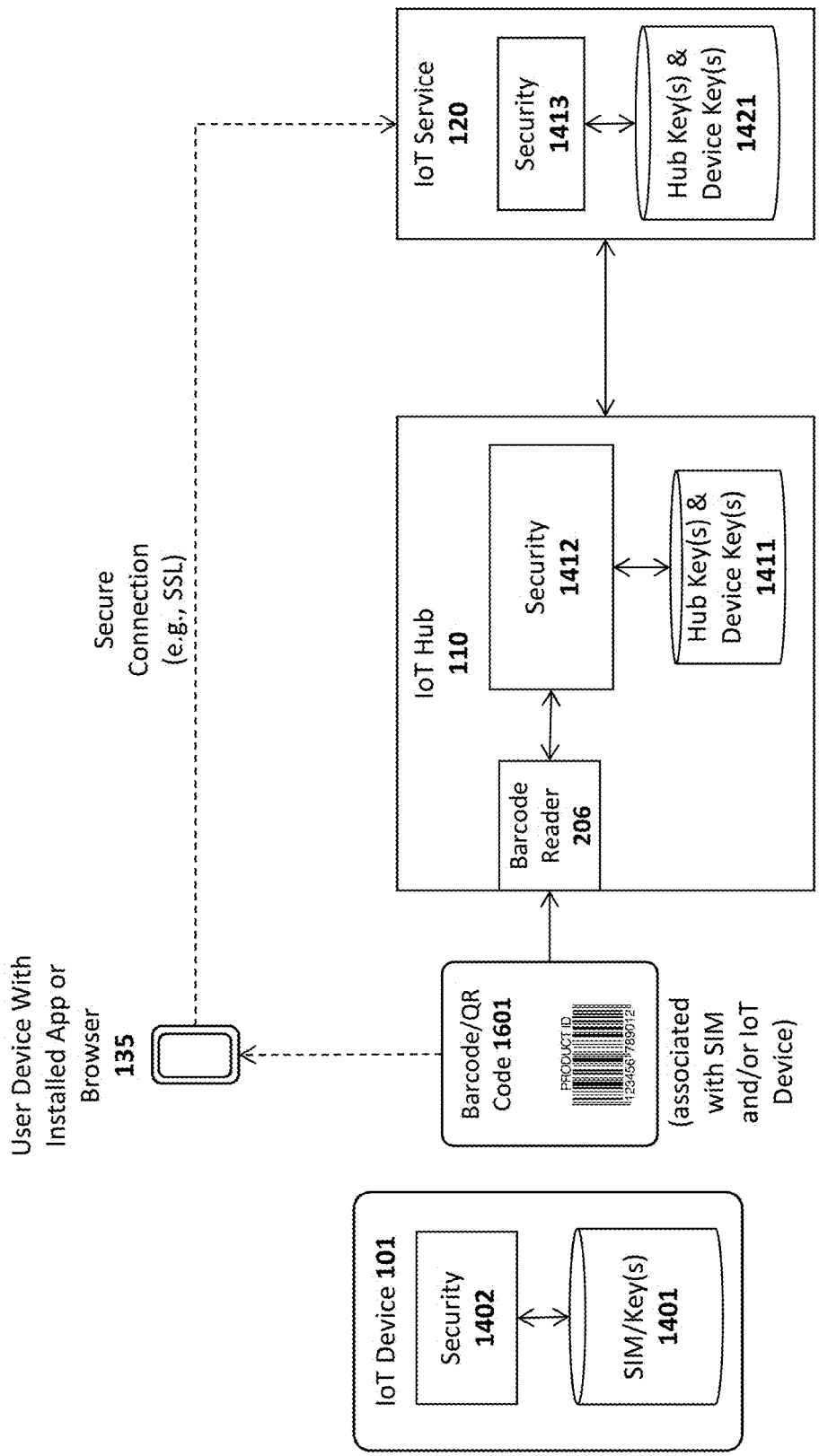
FIG. 16A illustrates one embodiment in which IoT devices are registered using barcodes or QR codes.

For example, as illustrated in FIG. 16A each IoT device 101 or SIM 401 may be packaged with a barcode or QR code 1501 uniquely identifying the IoT device 101 and/or SIM 1501. In one embodiment, the barcode or QR code 1601 comprises an encoded representation of the public key for the IoT device 101 or SIM 1001. Alternatively, the barcode or QR code 1601 may be used by the IoT hub 110 and/or IoT service 120 to identify or generate the public key (e.g., used as a pointer to the public key which is already stored in secure storage). The barcode or QR code 601 may be printed on a separate card (as shown in FIG. 16A) or may be printed directly on the IoT device itself. Regardless of where the barcode is printed, in one embodiment, the IoT hub 110 is equipped with a barcode reader 206 for reading the barcode and providing the resulting data to the security logic 1012 on the IoT hub 110 and/or the security logic 1013 on the IoT service 120. The security logic 1012 on the IoT hub 110 may then store the public key for the IoT device within its secure key storage 1011 and the security logic 1013 on the IoT service 120 may store the public key within its secure storage 1021 (to be used for subsequent encrypted communication).

In one embodiment, the data contained in the barcode or QR code 1601 may also be captured via a user device 135 (e.g., such as an iPhone or Android device) with an installed IoT app or browser-based applet designed by the IoT service provider. Once captured, the barcode data may be securely communicated to the IoT service 120 over a secure connection (e.g., such as a secure sockets layer (SSL) connection). The barcode data may also be provided from the client device 135 to the IoT hub 110 over a secure local connection (e.g., over a local WiFi or Bluetooth LE connection).

The security logic 1002 on the IoT device 101 and the security logic 1012 on the IoT hub 110 may be implemented using hardware, software, firmware or any combination thereof. For example, in one embodiment, the security logic 1002, 1012 is implemented within the chips used for establishing the local communication channel 130 between the IoT device 101 and the IoT hub 110 (e.g., the Bluetooth LE chip if the local channel 130 is Bluetooth LE). Regardless of the specific location of the security logic 1002, 1012, in one embodiment, the security logic 1002, 1012 is designed to establish a secure execution environment for executing certain types of program code. This may be implemented, for example, by using TrustZone technology (available on some ARM processors) and/or Trusted Execution Technology (designed by Intel). Of course, the underlying principles of the invention are not limited to any particular type of secure execution technology.

In one embodiment, the barcode or QR code 1501 may be used to pair each IoT device 101 with the IoT hub 110. For example, rather than using the standard wireless pairing process currently used to pair Bluetooth LE devices, a pairing code embedded within the barcode or QR code 1501 may be provided to the IoT hub 110 to pair the IoT hub with the corresponding IoT device.

Figure 16B:
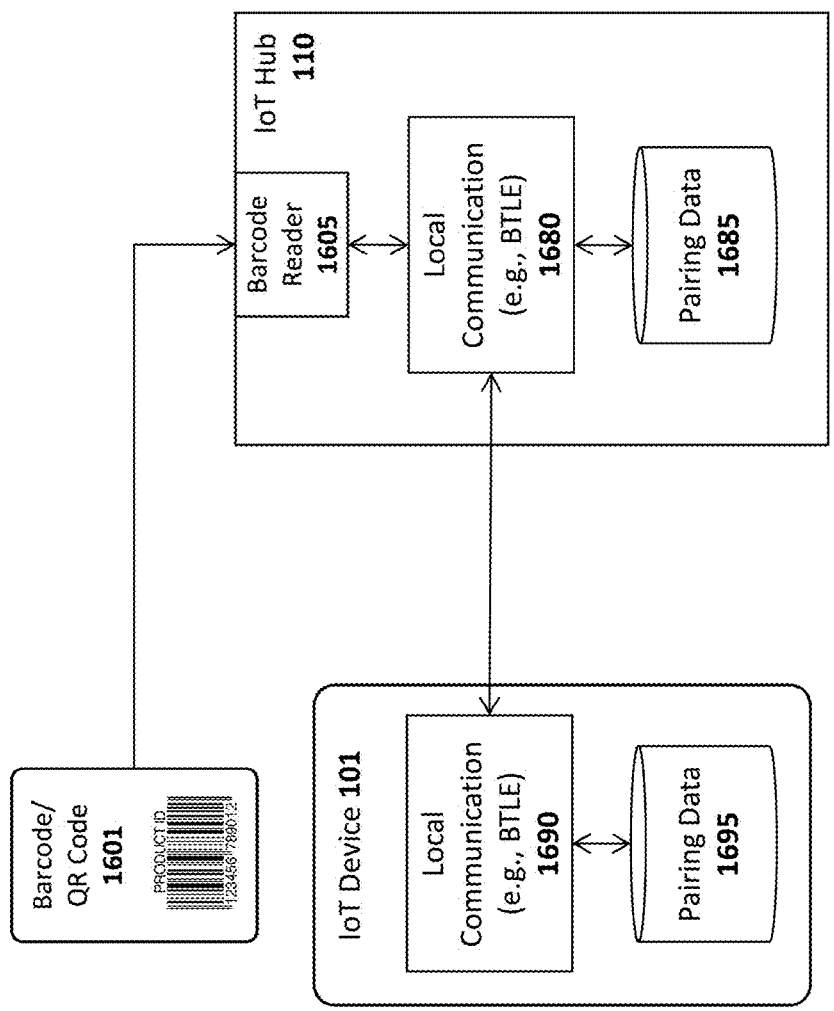
FIG. 16B illustrates one embodiment in which pairing is performed using barcodes or QR codes.

FIG. 16B illustrates one embodiment in which the barcode reader 206 on the IoT hub 110 captures the barcode/QR code 1601 associated with the IoT device 101. As mentioned, the barcode/QR code 1601 may be printed directly on the IoT device 101 or may be printed on a separate card provided with the IoT device 101. In either case, the barcode reader 206 reads the pairing code from the barcode/QR code 1601 and provides the pairing code to the local communication module 1680. In one embodiment, the local communication module 1680 is a Bluetooth LE chip and associated software, although the underlying principles of the invention are not limited to any particular protocol standard. Once the pairing code is received, it is stored in a secure storage containing pairing data 1685 and the IoT device 101 and IoT hub 110 are automatically paired. Each time the IoT hub is paired with a new IoT device in this manner, the pairing data for that pairing is stored within the secure storage 685. In one embodiment, once the local communication module 1680 of the IoT hub 110 receives the pairing code, it may use the code as a key to encrypt communications over the local wireless channel with the IoT device 101.

Similarly, on the IoT device 101 side, the local communication module 1590 stores pairing data within a local secure storage device 1595 indicating the pairing with the IoT hub. The pairing data 1695 may include the pre-programmed pairing code identified in the barcode/QR code 1601. The pairing data 1695 may also include pairing data received from the local communication module 1680 on the IoT hub 110 required for establishing a secure local communication channel (e.g., an additional key to encrypt communication with the IoT hub 110).

Thus, the barcode/QR code 1601 may be used to perform local pairing in a far more secure manner than current wireless pairing protocols because the pairing code is not transmitted over the air. In addition, in one embodiment, the same barcode/QR code 1601 used for pairing may be used to identify encryption keys to build a secure connection from the IoT device 101 to the IoT hub 110 and from the IoT hub 110 to the IoT service 120.

Figure 17:
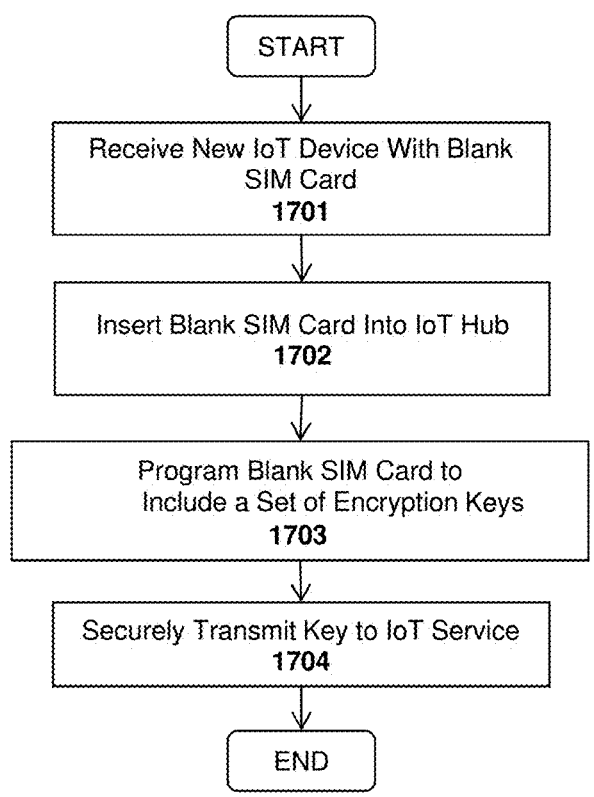
FIG. 17 illustrates one embodiment of a method for programming a SIM using an IoT hub.

A method for programming a SIM card in accordance with one embodiment of the invention is illustrated in FIG. 17. The method may be implemented within the system architecture described above, but is not limited to any particular system architecture.

At 1701, a user receives a new IoT device with a blank SIM card and, at 1602, the user inserts the blank SIM card into an IoT hub. At 1703, the user programs the blank SIM card with a set of one or more encryption keys. For example, as mentioned above, in one embodiment, the IoT hub may randomly generate a public/private key pair and store the private key on the SIM card and the public key in its local secure storage. In addition, at 1704, at least the public key is transmitted to the IoT service so that it may be used to identify the IoT device and establish encrypted communication with the IoT device. As mentioned above, in one embodiment, a programmable device other than a "SIM" card may be used to perform the same functions as the SIM card in the method shown in FIG. 17.

Figure 18:
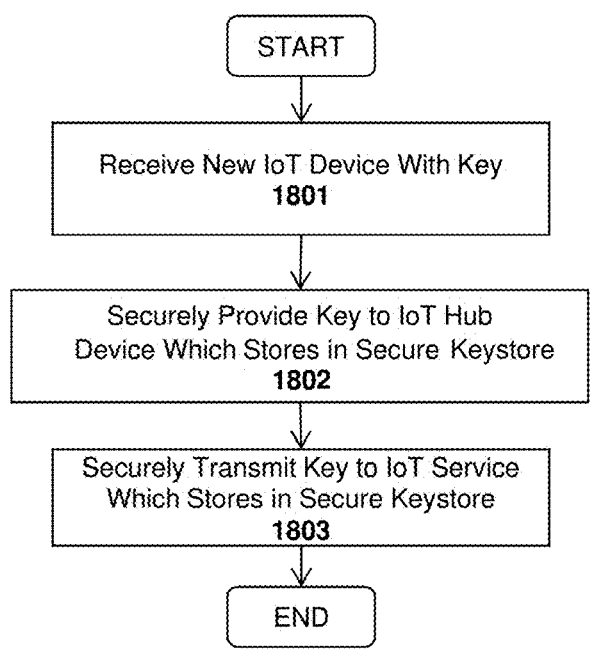
FIG. 18 illustrates one embodiment of a method for registering an IoT device with an IoT hub and IoT service.

A method for integrating a new IoT device into a network is illustrated in FIG. 18. The method may be implemented within the system architecture described above, but is not limited to any particular system architecture.

At 1801, a user receives a new IoT device to which an encryption key has been pre-assigned. At 1802, the key is securely provided to the IoT hub. As mentioned above, in one embodiment, this involves reading a barcode associated with the IoT device to identify the public key of a public/private key pair assigned to the device. The barcode may be read directly by the IoT hub or captured via a mobile device via an app or bowser. In an alternate embodiment, a secure communication channel such as a Bluetooth LE channel, a near field communication (NFC) channel or a secure WiFi channel may be established between the IoT device and the IoT hub to exchange the key. Regardless of how the key is transmitted, once received, it is stored in the secure keystore of the IoT hub device. As mentioned above, various secure execution technologies may be used on the IoT hub to store and protect the key such as Secure Enclaves, Trusted Execution Technology (TXT), and/or Trustzone. In addition, at 1803, the key is securely transmitted to the IoT service which stores the key in its own secure keystore. It may then use the key to encrypt communication with the IoT device. One again, the exchange may be implemented using a certificate/signed key. Within the hub 110 it is particularly important to prevent modification/addition/removal of the stored keys.

Figure 19:
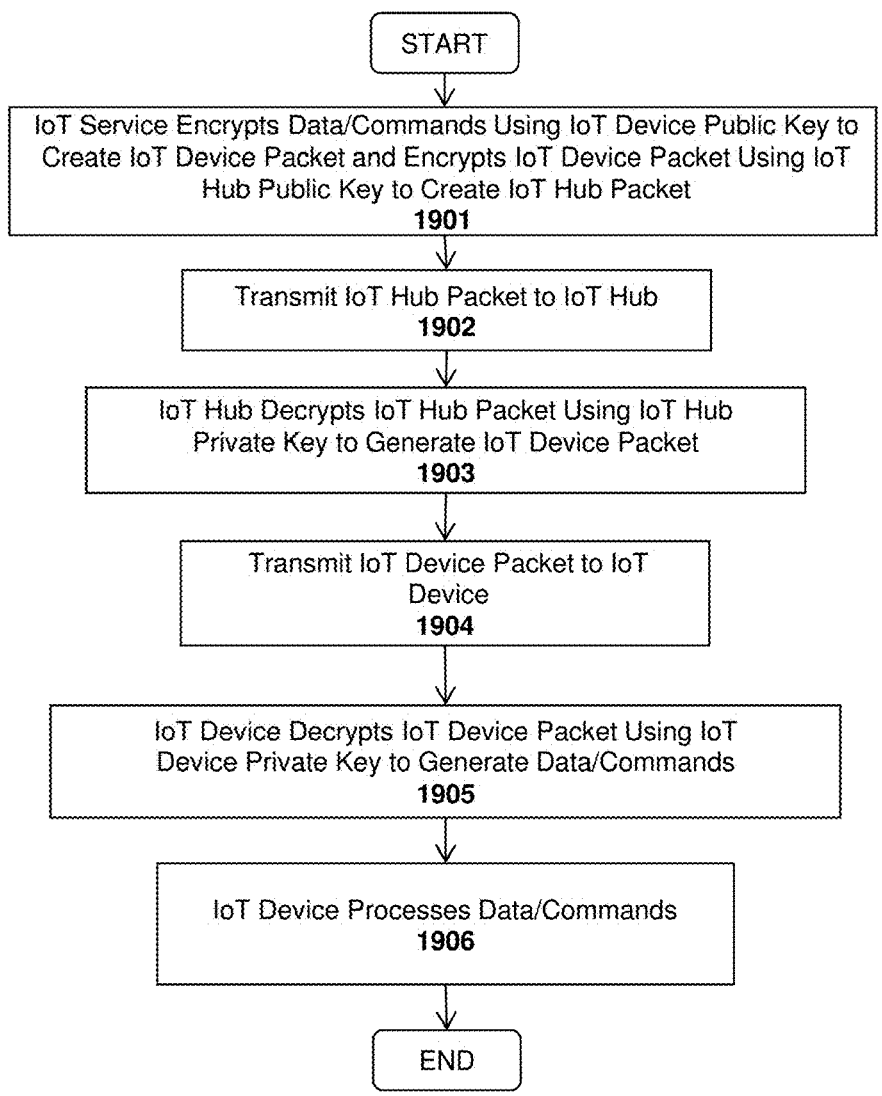
FIG. 19 illustrates one embodiment of a method for encrypting data to be transmitted to an IoT device.

A method for securely communicating commands/data to an IoT device using public/private keys is illustrated in FIG. 19. The method may be implemented within the system architecture described above, but is not limited to any particular system architecture.

At 1901, the IoT service encrypts the data/commands using the IoT device public key to create an IoT device packet. It then encrypts the IoT device packet using IoT hub's public key to create the IoT hub packet (e.g., creating an IoT hub wrapper around the IoT device packet). At 1902, the IoT service transmits the IoT hub packet to the IoT hub. At 1903, the IoT hub decrypts the IoT hub packet using the IoT hub's private key to generate the IoT device packet. At 1904 it then transmits the IoT device packet to the IoT device which, at 1905, decrypts the IoT device packet using the IoT device private key to generate the data/commands. At 1906, the IoT device processes the data/commands.

In an embodiment which uses symmetric keys, a symmetric key exchange may be negotiated between each of the devices (e.g., each device and the hub and between the hub and the service). Once the key exchange is complete, each transmitting device encrypts and/or signs each transmission using the symmetric key before transmitting data to the receiving device.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hard-wired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. A system comprising:
    a plurality of Internet of Things (IoT) devices located at different locations within a user's home or business;
    a first IoT device located at a first location within the user's home or business;
    a system calibration module to automatically collect a first set of signal strength data indicating signal strengths between a wireless device of a user and the plurality of IoT devices responsive to a physical interaction between the user and the first IoT device, the system calibration module further to associate the first set of signal strength data with the first location; and
    a location database to store the first set of signal strength data and the association with the first location in a location record;
    wherein responsive to detecting a second physical interaction between the user and the first IoT device at a second location within the user's home or business, the system calibration module is further to:
    collect a second set of signal strength data indicating signal strengths between the user's wireless device and the plurality of IoT devices and associate the second set of signal strength data with the second location;
    query the user through an application on the user's wireless device to confirm the second physical interaction at the second location; and
    update the location record in the location database with the second set of signal strength data and the association with the second location responsive to receiving a confirmation from the user indicating that the first IoT device has been moved from the first location to the second location.

2. The system as in claim 1, wherein the first IoT device comprises, or is coupled to, an appliance, a lighting system, an audiovisual equipment, or a heating, ventilation, and air conditioning (HVAC) equipment.

3. The system as in claim 2, wherein the first IoT device comprises a refrigerator and the physical interaction comprises the user opening or closing a door of the refrigerator.

4. The system as in claim 2, wherein the first IoT device comprises a lighting system and the physical interaction comprises the user adjusting one or more lights in the lighting system.

5. The system as in claim 1, wherein a global positioning system (GPS) of the wireless device is to provide GPS data associated with the first location.

6. The system as in claim 5, wherein the location record further stores the GPS data associated with the first location.

7. The system as in claim 6, wherein the first set of signal strength data comprises received signal strength indicator (RSSI) values between the wireless device and the plurality of IoT devices measured from the first location.

8. The system as in claim 1, further comprising:
    a signal strength analysis module to determine a current location of the wireless device by comparing stored signal strength data in the location database with current signal strength data indicating current signal strength between the wireless device and one or more of the plurality of IoT devices measured from the current location.

9. The system as in claim 8, further comprising:
    an IoT hub on which the system calibration module and the signal strength analysis module are executed.

10. The system as in claim 8, wherein the signal strength analysis module is to receive a current set of signal strength values and compare those values with the stored signal strength data in the location database to determine the current location of the wireless device.

11. The system as in claim 10, wherein the signal strength analysis module is to determine that the wireless device is near the first location if the current signal strength values are within a specified range of the first set of signal strength data in the location database associated with the first location.

12. The system of claim 11, wherein the signal strength analysis module is to dynamically adjust the specified range when two or more signal strength data in the first set of signal strength data are close in value.

13. A method comprising:
    collecting a first set of signal strength data indicating signal strengths between a user's wireless device and a plurality of Internet of Things (IoT) devices located at different locations within a user's home or business responsive to a first physical interaction between a user and a first IoT device, the first IoT device located at a first location within the user's home or business;
    associating the first set of signal strength data with the first location;
    storing collected signal strength data and the association with the first location in a location database as a location record;
    detecting a second physical interaction between the user and the first IoT device at a second location within the user's home or business and responsively collecting a second set of signal strength data indicating signal strengths between the user's wireless device and the plurality of IoT devices and associating the second set of signal strength data with the second location;

querying the user through an application on the user's wireless device to confirm the second physical interaction at the second location; and updating the location record in the location database with the second set of signal strength data and the association with the second location responsive to receiving a confirmation from the user indicating that the first IoT device has been moved from the first location to the second location.

14. The method as in claim 13, wherein the first IoT device comprises, or is coupled to, an appliance, a lighting system, an audiovisual equipment, or a heating, ventilation, and air conditioning (HVAC) equipment.

15. The method as in claim 13, wherein the first IoT device comprises a refrigerator and the physical interaction comprises the user opening or closing a door of the refrigerator.

16. The method as in claim 13, wherein the first IoT device comprises a lighting system and the physical interaction comprises the user adjusting one or more lights in the lighting system.

17. The method as in claim 13, further comprising: providing, by a global positioning system (GPS) of the wireless device, GPS data associated with the first location.

18. The method as in claim 17, further comprising: storing, in the location record, the GPS data associated with the first location.

19. The method as in claim 18, wherein the first set of signal strength data comprises signal strength indicator (RSSI) values between the wireless device and the plurality of IoT devices at measured from the first location.

20. The method as in claim 13, further comprising:
determining a current location of the wireless device within the home or business by comparing stored signal strength data in the location database with current signal strength data indicating current signal strength between the wireless device and the plurality of IoT devices measured from the current location.

21. The method as in claim 20, further comprising:
comparing a current set of signal strength values in the current signal strength data with the stored signal strength data in the location database to determine the current location of the wireless device.

22. The method as in claim 21, further comprising determining that the wireless device is in a particular location if the current set of signal strength values are within a specified range of a particular set of signal strength data stored in the location database.

* * * * *